(12) United States Patent
Kasahara

(10) Patent No.: US 10,614,605 B2
(45) Date of Patent: *Apr. 7, 2020

(54) INFORMATION PROCESSING APPARATUS, INFORMATION PROCESSING METHOD, AND PROGRAM FOR DISPLAYING A VIRTUAL OBJECT ON A DISPLAY

(71) Applicant: SONY CORPORATION, Tokyo (JP)

(72) Inventor: Shunichi Kasahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/892,032

(22) Filed: Feb. 8, 2018

(65) Prior Publication Data

US 2018/0232924 A1    Aug. 16, 2018

Related U.S. Application Data

(63) Continuation of application No. 14/344,135, filed as application No. PCT/JP2012/005904 on Sep. 14, 2012, now Pat. No. 9,928,626.

(30) Foreign Application Priority Data

Nov. 11, 2011  (JP) .................................. 2011-247568

(51) Int. Cl.
    *G06T 11/60*    (2006.01)
(52) U.S. Cl.
    CPC .................................... *G06T 11/60* (2013.01)
(58) Field of Classification Search
    None
    See application file for complete search history.

(56) References Cited

U.S. PATENT DOCUMENTS

| | | |
|---|---|---|
| 5,850,352 A | 12/1998 | Moezzi |
| 7,119,831 B2 | 10/2006 | Ohto |
| 7,427,996 B2 | 9/2008 | Yonezawa |
| 7,583,275 B2 | 9/2009 | Neumann |
| 7,720,436 B2 | 5/2010 | Hamynen |
| 8,384,770 B2 | 2/2013 | Konno |
| 8,730,156 B2 | 5/2014 | Weising |
| 9,256,986 B2 | 2/2016 | Kasahara |
| 9,390,488 B2 | 7/2016 | Ueno |
| 2002/0191862 A1 | 12/2002 | Neumann |

(Continued)

FOREIGN PATENT DOCUMENTS

| | | |
|---|---|---|
| DE | 10 2009 037 835 A1 | 2/2011 |
| JP | 2003-256876 A | 9/2003 |

(Continued)

OTHER PUBLICATIONS

International Search Report dated Oct. 9, 2012 in PCT/JP2012/005904.

(Continued)

*Primary Examiner* — Jason A Pringle-Parker
(74) *Attorney, Agent, or Firm* — Xsensus, LLP

(57) ABSTRACT

An apparatus including an image processor configured to receive a video including an object, determine a positional relationship between the apparatus and the object, and change a positional relationship between an image superimposed on the video and the object when the positional relationship between the apparatus and the object changes.

7 Claims, 19 Drawing Sheets

(56) References Cited

U.S. PATENT DOCUMENTS

| | | |
|---|---|---|
| 2006/0050087 A1 | 3/2006 | Tanimura |
| 2007/0273644 A1 | 11/2007 | Mondine Natucci |
| 2008/0186255 A1 | 8/2008 | Cohen |
| 2010/0228632 A1 | 9/2010 | Rodriguez |
| 2010/0239121 A1 | 9/2010 | Meier |
| 2011/0254861 A1* | 10/2011 | Emura ............ G06F 3/0488 345/633 |
| 2011/0304611 A1 | 12/2011 | Suzuki |
| 2011/0304616 A1* | 12/2011 | Ham ............ G02B 27/0093 345/419 |
| 2012/0081394 A1 | 4/2012 | Campbell |
| 2012/0081527 A1* | 4/2012 | Richardson ........ H04N 13/341 348/56 |
| 2012/0176410 A1* | 7/2012 | Meier ............ G06F 3/011 345/633 |
| 2012/0218257 A1 | 8/2012 | Hisano |
| 2012/0218298 A1 | 8/2012 | Hayakawa |
| 2013/0184064 A1 | 7/2013 | Manning |
| 2013/0234926 A1 | 9/2013 | Rauber |
| 2013/0290876 A1 | 10/2013 | Anderson |
| 2013/0307855 A1 | 11/2013 | Lamb |
| 2014/0108136 A1 | 4/2014 | Zhao |
| 2014/0375691 A1 | 12/2014 | Kasahara |
| 2015/0015611 A1 | 1/2015 | Meier et al. |
| 2015/0332500 A1 | 11/2015 | France |

FOREIGN PATENT DOCUMENTS

| | | |
|---|---|---|
| JP | 2005-250950 A | 9/2005 |
| JP | 2007-117260 A | 5/2007 |
| JP | 2008-65807 A | 3/2008 |
| JP | 2008-521110 A | 6/2008 |
| JP | 2009-119818 A | 6/2009 |
| JP | 2010-231741 A | 10/2010 |
| JP | 2012-84146 A | 4/2012 |
| WO | WO 2010/073616 A1 | 7/2010 |
| WO | WO 2011/020793 A2 | 2/2011 |

OTHER PUBLICATIONS

Office Action dated May 12, 2015 in Japanese Patent Application No. 2011-247568.

Extended European Search Report dated May 19, 2015 in Patent Application No. 12846930.1.

Office Action dated Aug. 4, 2015 in Japanese Patent Application No. 2011-247568.

Japanese Office Action dated Dec. 22, 2015 in Patent Application No. 2011-247568 (without English Translation).

Office Action dated Feb. 29, 2016 in Chinese Patent Application No. 201280053978.3 (with English Translation).

Japanese Office Action dated Aug. 16, 2016 in Patent Application No. 2015-214113.

* cited by examiner

[Fig. 5]
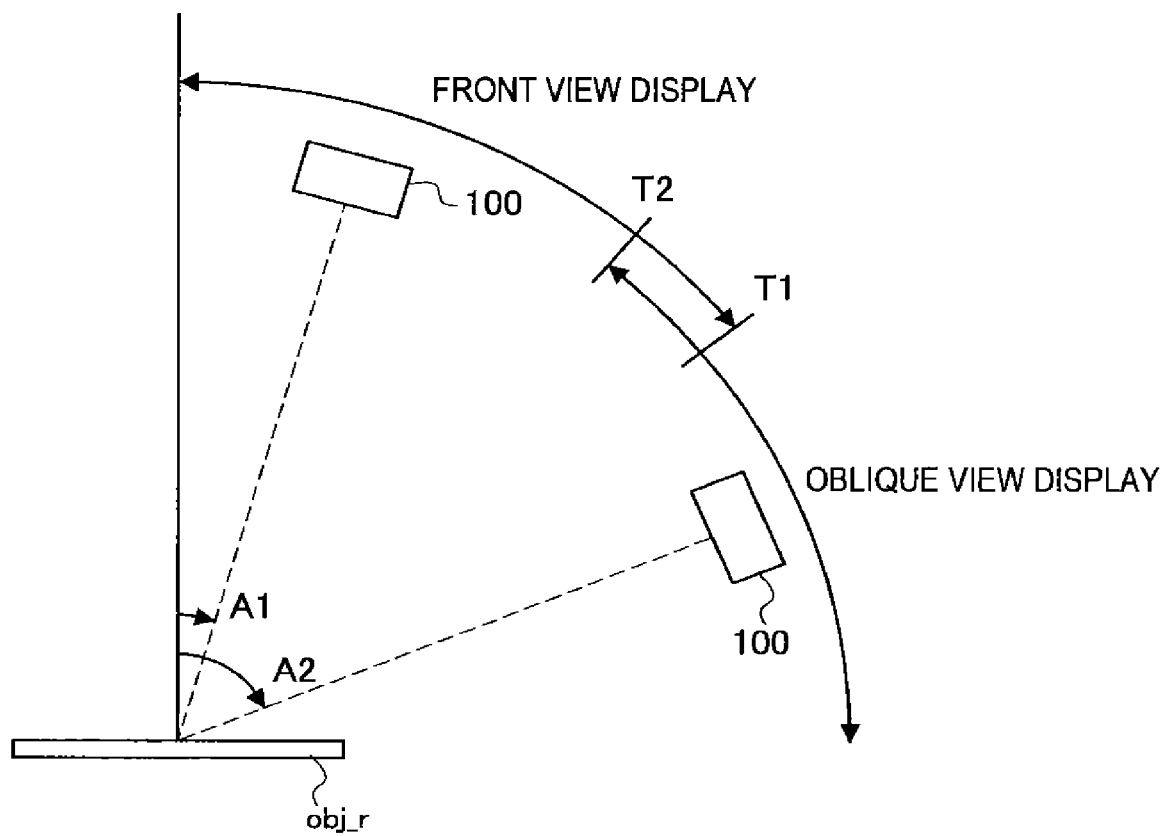

[Fig. 6]
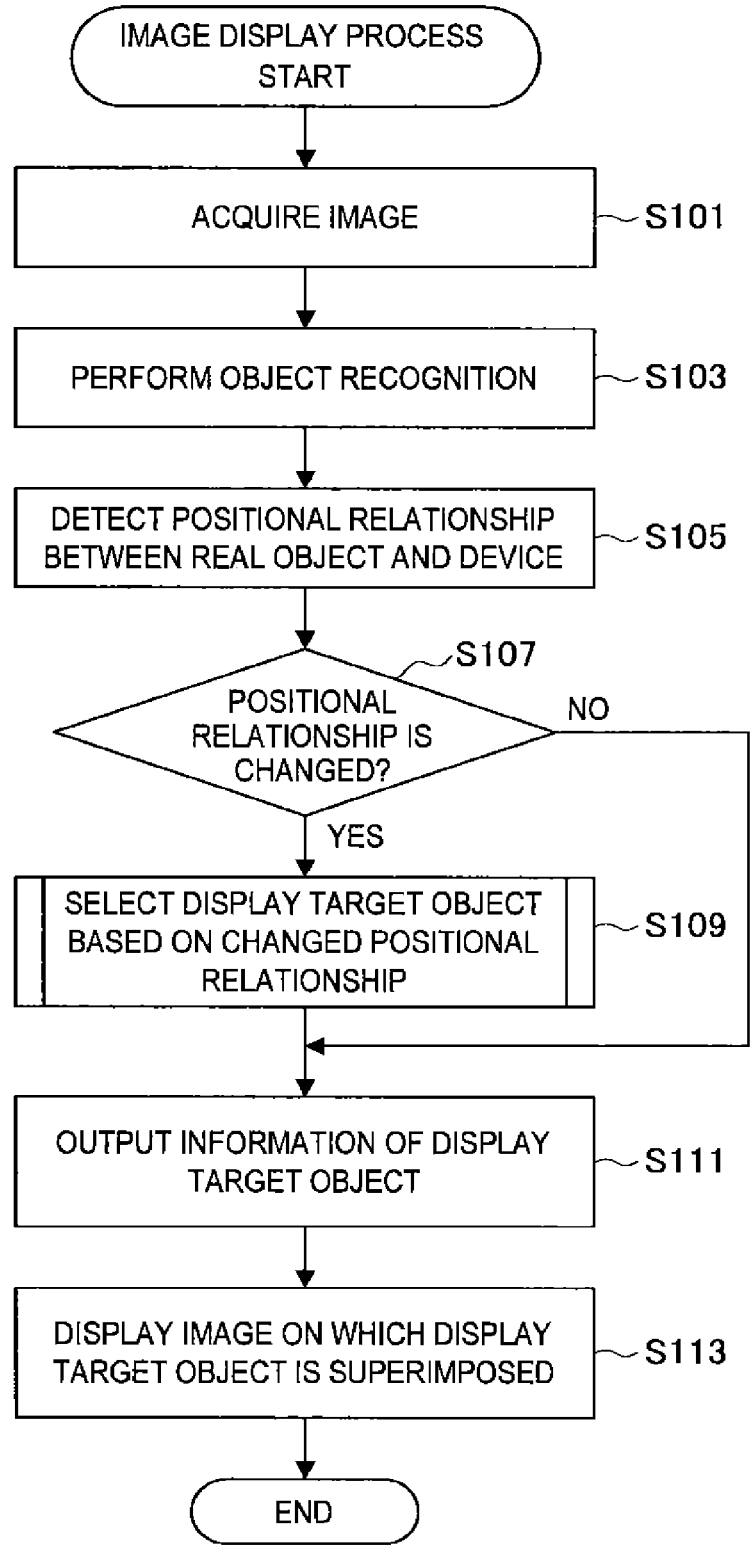

[Fig. 7]
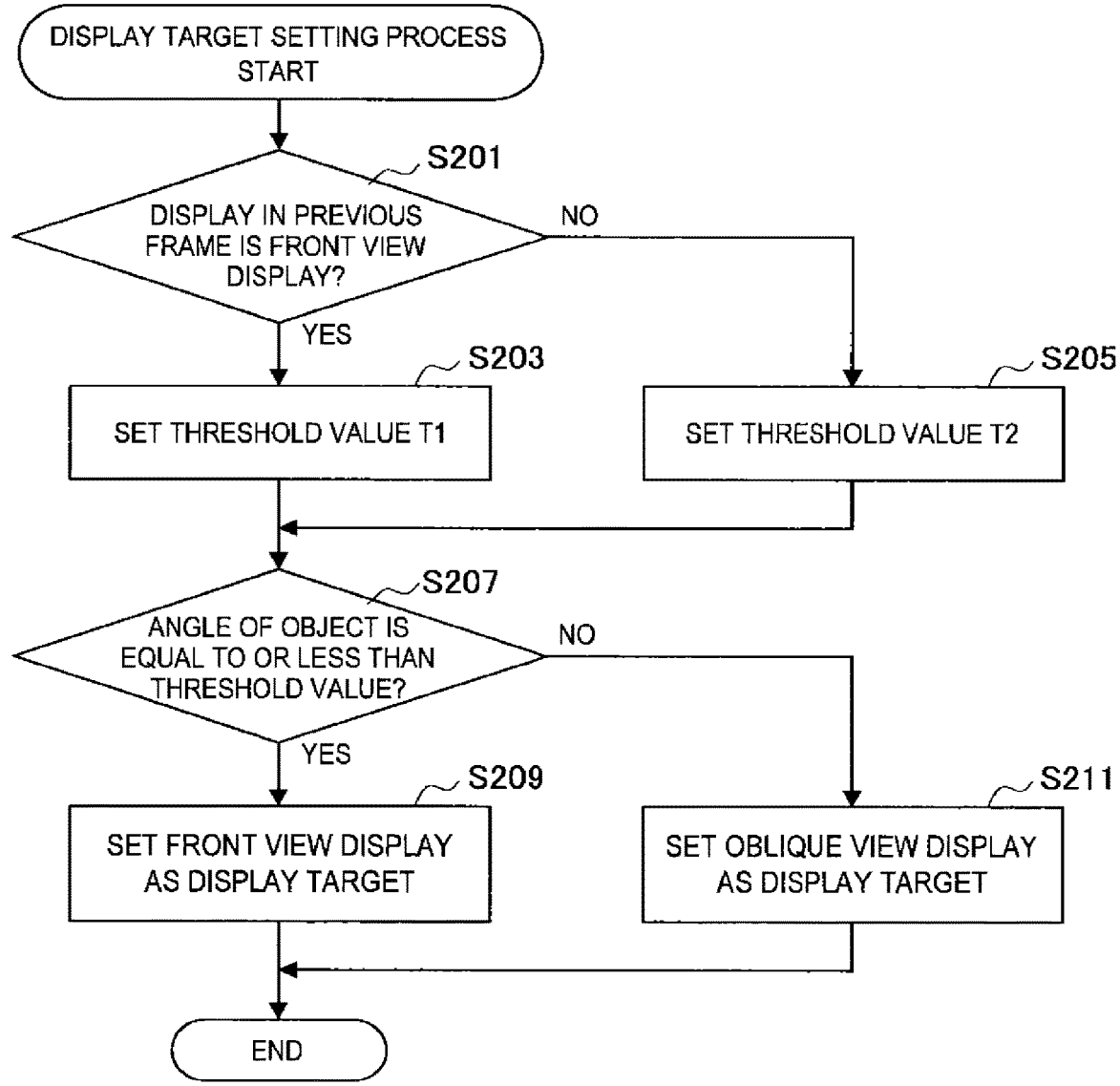

[Fig. 11]
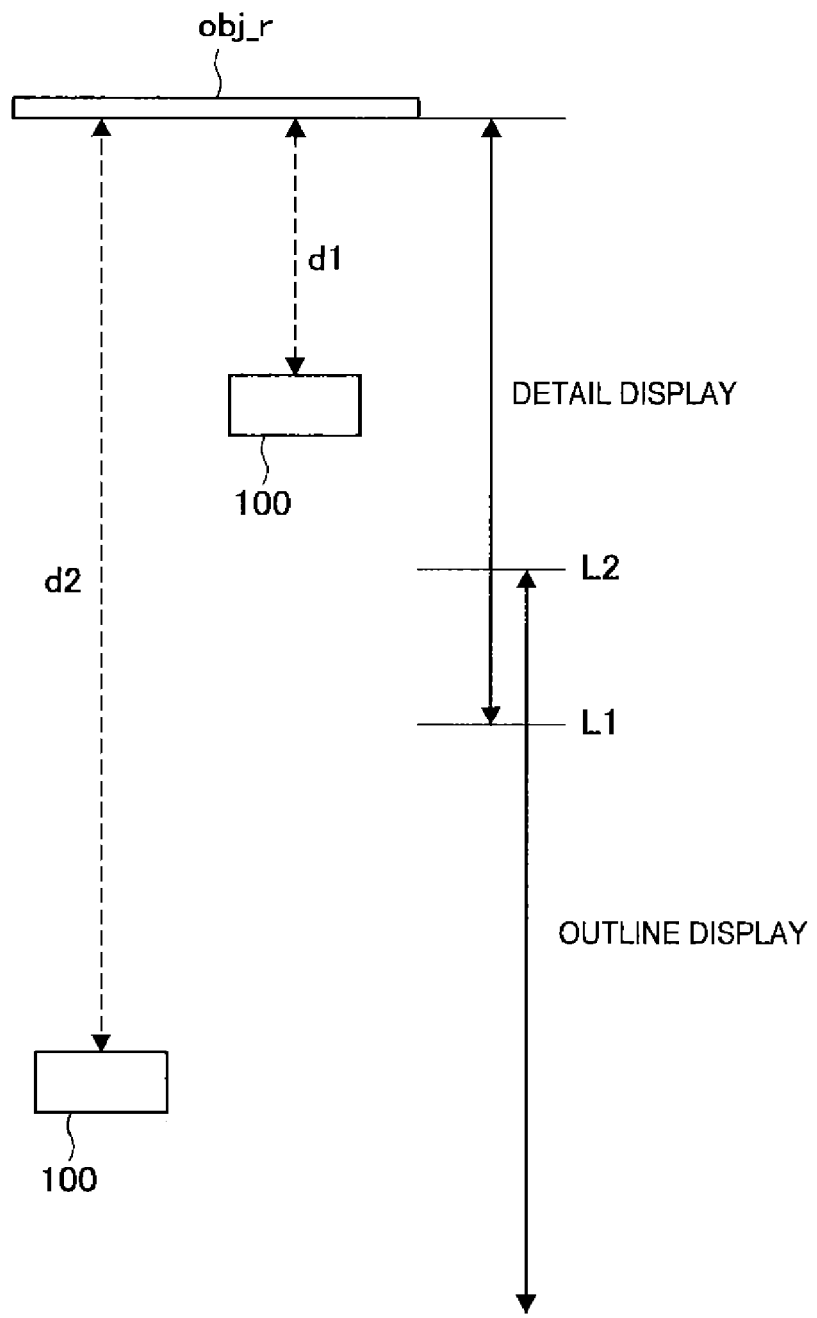

[Fig. 16]

INFORMATION PROCESSING APPARATUS, INFORMATION PROCESSING METHOD, AND PROGRAM FOR DISPLAYING A VIRTUAL OBJECT ON A DISPLAY

CROSS-REFERENCE TO RELATED APPLICATIONS

This application is a continuation application U.S. application Ser. No. 14/344,135, filed on Mar. 11, 2014, currently pending, which is a National Stage of PCT/JP12/05904, filed Sep. 14, 2012, which claims the benefit of priority under 35 U.S.C. § 119 from Japanese Patent Application No. 2011-247568, filed Nov. 11, 2011. The entire contents of all of the above are incorporated herein by reference.

TECHNICAL FIELD

The present disclosure relates to an information processing apparatus, an information processing method, and a program encoded on a non-transitory computer readable medium.

BACKGROUND ART

In recent years, a technique called augmented reality (AR) in which additional information is superimposed on a real image so as to be presented to a user has attracted attention. In the AR technique, information presented to a user is also called annotation and the information is visualized as various types of virtual objects such as, for example, texts, icons or animation. As an example of the AR technique, Patent Literature 1 discloses a technique in which an image of a virtual object imitating a real object such as furniture is superimposed on a real image so as to be displayed, thereby easily attempting to arrange furniture and so on.

CITATION LIST

Patent Literature

[PTL 1]
JP 2003-256876A

SUMMARY

Technical Problem

The above-described AR technique is realized, for example, by capturing a real image using a device held by the user and by superimposing the display of a virtual object related to a real object reflected in the image. In this case, for example, postures of the reflected real object are variously changed depending on the movement of the user or changes in methods of holding the device. That is to say, even in the same real object, a size or angle in the image is changed depending on the circumstances. Thus, even if a captured image of the same real object is displayed, there are cases where appropriate display methods of additional information are different.

Therefore, it is desirable to provide novel and improved information processing apparatus, information processing method, and program encoded on a non-transitory computer readable medium, capable of appropriately displaying additional information so as to be suitable for a posture of a real object.

Solution to Problem

In one embodiment, the present invention includes apparatus including an image processor configured to receive a video including an object, determine a positional relationship between the apparatus and the object, and change a positional relationship between an image superimposed on the video and the object when the positional relationship between the apparatus and the object changes.

Advantageous Effects of Invention

As described above, according to embodiments of the present disclosure, it is possible to appropriately display additional information so as to be suitable for a posture of a real object.

BRIEF DESCRIPTION OF DRAWINGS

FIG. 5 is a diagram illustrating a change in display of a virtual object by the information processing apparatus according to the first embodiment of the present disclosure;

FIG. 6 is a flowchart illustrating an example of the process flow of image display process in the information processing apparatus according to the first embodiment of the present disclosure;

FIG. 7 is a flowchart illustrating an example of the process flow of display target setting process in the information processing apparatus according to the first embodiment of the present disclosure;

FIG. 11 is a diagram illustrating a change in display of a virtual object by the information processing apparatus according to the second embodiment of the present disclosure;

DESCRIPTION OF EMBODIMENTS

Figure 1B:
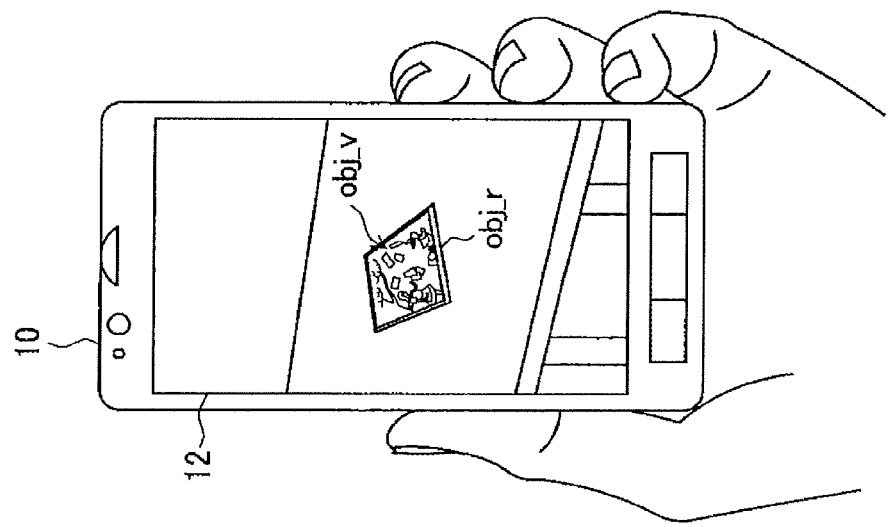
FIG. 1 is a diagram illustrating a reference technique regarding a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.

1. First Embodiment (an example of changing a display position relative to a real object)
2. Second Embodiment (an example of changing an amount of displayed information)
3. Third Embodiment (an example of changing a content of displayed information)
4. Other Embodiments regarding Apparatus Configuration
5. Supplement

1. First Embodiment

The first embodiment of the present disclosure will be described with reference to FIGS. 1 to 8. In the first embodiment of the present disclosure, a display position of a virtual object relative to a real object is changed depending on a relative positional relationship between the real object reflected in an image and a device capturing the image.

1-1. Reference Technique

Figure 1A:
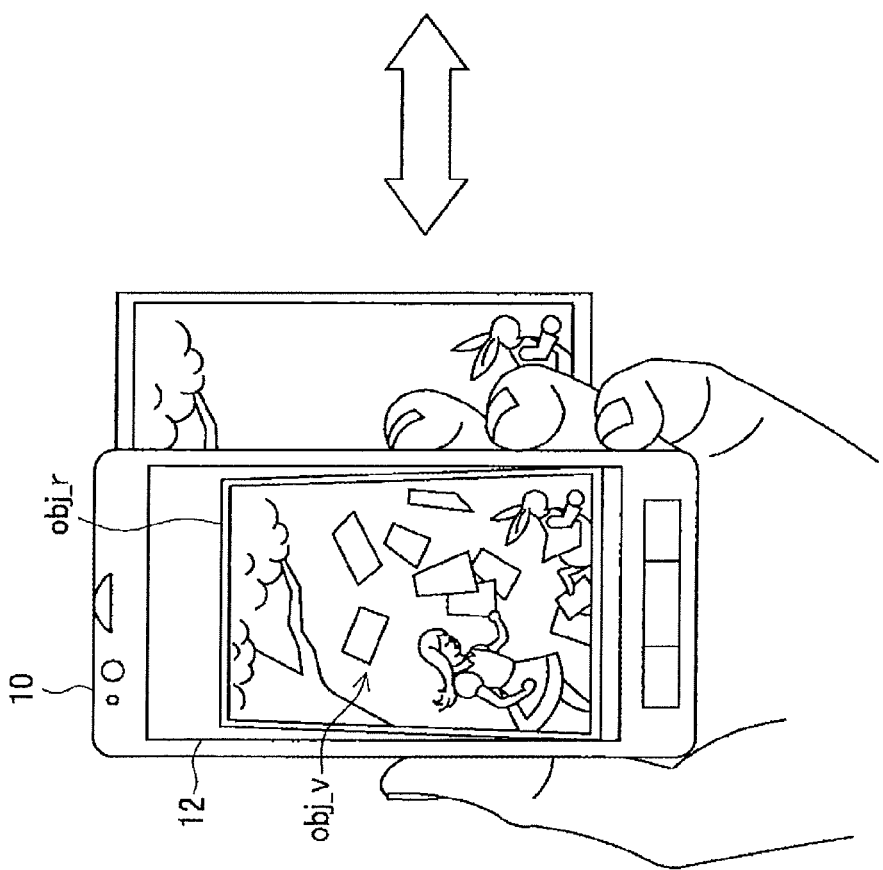

First, a description will be made of a reference technique for better understanding of the present embodiment. FIG. 1 is a diagram illustrating the reference technique regarding the first embodiment of the present disclosure.

An information processing apparatus 10 related to the reference technique is shown in FIG. 1. The information processing apparatus 10 includes an image pickup unit (not shown) and a display unit 12, and the information processing apparatus 10 executes an AR application.

Here, the display unit 12 displays an image where the information processing apparatus 10 superimposes a virtual object obj_v related to a real object obj_r on an image in which the real object obj_r captured by the image pickup unit is reflected. In the shown example, in a case where the real object obj_r (a book) is captured from the front side as shown in (a) of FIG. 1, and in a case where the real object obj_r is captured obliquely as shown in (b) of FIG. 1, the virtual object obj_v (an image regarding a content of the book) is transformed into different forms and is displayed. In other words, the virtual object obj_v is transformed and displayed to be suitable for the change in the appearance due to the change in a posture of the real object obj_r.

As such, in the AR application, there are cases where a virtual object is transformed to be suitable for a posture of a real object and is disposed in an AR space. Thereby, for example, a user recognizes the virtual object as if the virtual object is reflected on a surface of a real object and exists therein, and thus can easily understand a relationship between the real object and the virtual object.

However, as shown in (b) of FIG. 1 of the illustrated example, there is a case where it is difficult for the transformed virtual object obj_v to be visually recognized according to a posture of the real object obj_r. In this case, it is difficult to say that the virtual object obj_v is displayed in an appropriate manner.

Therefore, in the present embodiment, by changing a display position of a virtual object relative to a real object depending on a positional relationship between the real object reflected in an image and a device capturing the image, even in the case, it is possible to display the virtual object obj_v in an appropriate manner.

1-2. Apparatus Configuration

Figure 2:
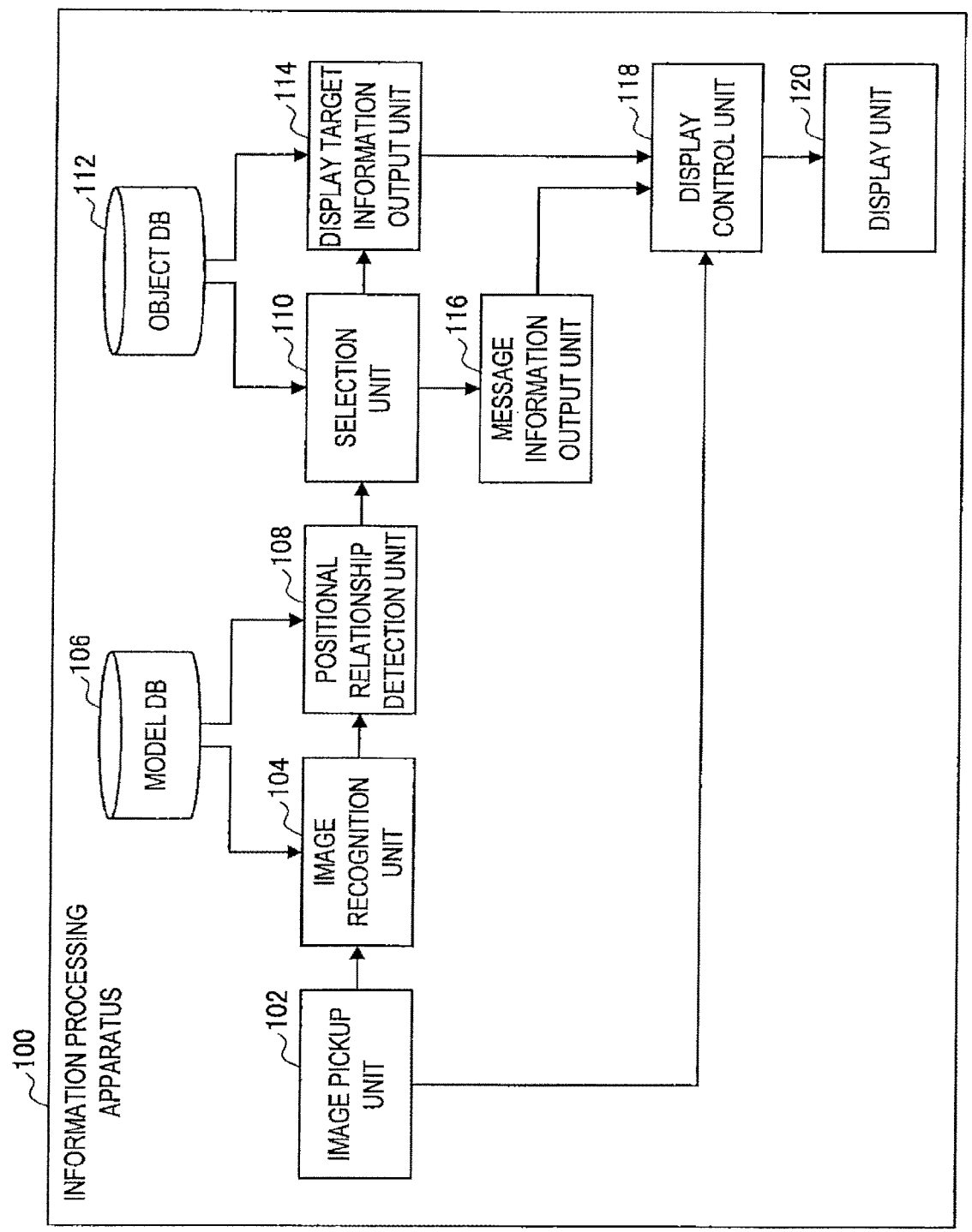
FIG. 2 is a block diagram illustrating an example of the functional configuration of the information processing apparatus according to the first embodiment of the present disclosure.

Next, with reference to FIG. 2, a functional configuration according to the present disclosure will be described. FIG. 2 is a block diagram illustrating an example of the functional configuration of the information processing apparatus according to the first embodiment of the present disclosure.

Referring to FIG. 2, an information processing apparatus 100 according to the present embodiment includes an image pickup unit 102, an image recognition unit 104, a model DB 106, a positional relationship detection unit 108, a selection unit 110, an object DB 112, a display target information output unit 114, a message information output unit 116, a display control unit 118, and a display unit 120.

In the present embodiment, the information processing apparatus 100 will be described as a terminal apparatus into which the respective units including the image pickup unit and the display unit, such as a smart phone, a tablet type PC (Personal Computer), PDA (Personal Digital Assistant), a portable gaming machine, or a portable music player are integrated. However, the information processing apparatus 100 may be other information processing apparatuses such as a notebook type or desktop type PC. In this case, for example, the image pickup unit or the display unit may be provided separately from the other units. In addition, in a case where the information processing apparatus 100 is divided into a plurality of units, the "information processing apparatus 100" in the disclosure such as a "positional relationship between the information processing apparatus 100 and a real object" or an "angle of a real object relative to the information processing apparatus 100" indicates a portion at which the image pickup unit of the information processing apparatus 100 is provided unless otherwise specifically defined herein.

Among the above-described functional configurations, the image pickup unit 102 is realized by, for example, an image pickup device included in the information processing apparatus 100. In addition, the image recognition unit 104, the positional relationship detection unit 108, the selection unit 110, the display target information output unit 114, the message information output unit 116, and the display control unit 118 are realized by, for example, a CPU (Central Processing Unit), a RAM (Random Access Memory), and a ROM (Read Only Memory) of the information processing apparatus 100 being operated according to a program. The model DB 106 and the object DB 112 are realized by, example, an internal or external storage device of the information processing apparatus 100. The display unit 120 is realized by, for example, a variety of displays which are included in the information processing apparatus 100 as output devices or are connected to the information processing apparatus 100 as external connection devices.

<Image Pickup Unit>

The image pickup unit 102 captures a real space to generate an image. The image pickup unit 102 may capture moving images. The moving images are configured by a plurality of images forming consecutive frames. The image pickup unit 102 provides the generated image to both the image recognition unit 104 and the display control unit 118. At this time, the generated image may be temporarily stored in, for example, the RAM or the storage device.

<Image Recognition Unit>

The image recognition unit 104 performs object recognition using data stored in the model DB 106. The model DB 106 is a database which stores in advance model data regarding shapes or appearances of objects which are targets recognized by the information processing apparatus 100. In the present embodiment, targets recognized by the information processing apparatus 100 are any objects in a real space. The model data includes data defining a shape of each object, image data such as a predetermined symbol mark or a text label added to each object, data of a feature amount set extracted from an existing image for each object, and the like.

More specifically, the image recognition unit 104 uses an image captured by the image pickup unit 102 as an input image, thereby recognizing which object is reflected in the input image. The image recognition unit 104 compares, for example, a feature point set extracted from the input image with a shape of an object defined by the model data. In addition, the image recognition unit 104 may compare image data such as a symbol mark or a text label defined by the model data with the input image. Furthermore, the image recognition unit 104 may compare a feature amount of an image of an existing object defined by the model data with a feature amount extracted from the input image.

<Positional Relationship Detection Unit>

The positional relationship detection unit 108 detects a positional relationship between the object recognized by the image recognition unit 104 and the information processing apparatus 100 (more specifically, the image pickup unit 102). In the present embodiment, an angle of the object relative to the information processing apparatus 100 is used as a positional relationship between the object and the information processing apparatus 100. This angle is expressed as, for example, a tilt from a reference posture which is set for an object in advance. In other words, in the present embodiment, the positional relationship detection unit 108 detects a posture relationship between the object and the information processing apparatus 100 as the positional relationship between the object and the information processing apparatus 100.

More specifically, the positional relationship detection unit 108 uses an image captured by the image pickup unit 102 as an input image, thereby detecting a posture of an object reflected in the input image. Here, in the present embodiment, a posture of the object is collectively expressed by a 4*4 homogeneous transformation matrix indicating transformation between a model coordinate system in the model data stored in the model DB 106 and a coordinate system of the object reflected in the input image. The positional relationship detection unit 108 extracts an angle of the object relative to the information processing apparatus 100 from the homogeneous transformation matrix.

In addition, detailed examples of the positional relationship acquired by the positional relationship detection unit 108 will be described later. Since a process performed by the positional relationship detection unit 108 is common to a process performed by the image recognition unit 104 such as referring to the model DB 106, the process may be performed along with the process performed by the image recognition unit 104.

<Selection Unit>

The selection unit 110 selects a display target object which is superimposed on an image, from a virtual object group including a plurality of kinds of virtual objects related to the real object, according to the positional relationship detected by the positional relationship detection unit 108. More specifically, the selection unit 110 selects a virtual object from a virtual object group including a plurality of virtual objects of which the display positions relative to the real object are different from each other, according to the angle of the real object relative to the information processing apparatus 100. The virtual object is displayed at a position which is easily visually recognized by a user. The angle of the real object relative to the information processing apparatus 100 is acquired by the positional relationship detection unit 108. Such a virtual object and an example of the selection of a virtual object by the selection unit 110 will be described later.

In the present embodiment, data of the virtual object group is stored in the object DB 112. The object DB 112 may be a database which stores in advance data of a virtual object group corresponding to each real object. In addition, the object DB 112 may be a database which temporarily stores a virtual object group which corresponds to a real object recognized by the image recognition unit 104 and is downloaded from an external device.

Furthermore, the object DB 112 may be a database which temporarily stores a virtual object which is obtained by processing a part of or the overall real object reflected in an image captured by the image pickup unit 102. The processing of the real object is performed by a processing unit (not shown). The processing unit may generate a virtual object by processing an image according to a result of a selection made by the selection unit 110. In this case, for example, the selection unit 110 refers to information indicating "what kind of virtual object can be generated" stored in the object DB 112. The selection unit 110 also selects the kind of virtual object to be displayed and instructs the processing unit to generate the virtual object.

In addition, as described later as an example of the alternative selection and the message display, in a case where a selected virtual object cannot be displayed in an image region, the selection unit 110 may make an alternative selection of a virtual object which can be displayed in the image region regardless of the selection result.

In addition, the selection unit 110 may adjust a selection result such that the same kind of virtual object is selected for a plurality of real objects related to each other. In this case, for example, the selection unit 110 may average results detected by the positional relationship detection unit 108 for the respective real objects. The selection unit 110 also may use the averaged result as a positional relationship common to the respective real objects. In addition, the selection unit 110 may count the results detected by the positional relationship detection unit 108 for the respective real objects and may use a detection result detected from more real objects as a positional relationship common to the respective real objects. Thereby, for example, the kinds of virtual objects displayed for a plurality of real objects related to each other can be unified, and the unification of the virtual objects for the real objects can be shown to a user.

<Display Target Information Output Unit>

The display target information output unit 114 outputs information of the display target object selected by the selection unit 110 to the display control unit 118 such that the information is superimposed on the image captured by the image pickup unit 102 so as to be displayed. Here, the output information of the display target object may be image data itself of a virtual object or may be identification information such as an ID for separately referring to the image data of the virtual object. Here, in a case of outputting the image data of the virtual object, the display target information output unit 114 may generate a superimposed image of the virtual object, for example, according to a positional relationship between the real object and the information processing apparatus 100. The positional relationship is detected by the positional relationship detection unit 108. The display target information output unit 114 also may output information of the superimposed image to the display control unit 118. For this process, the display target information output unit 114 may refer to the object DB 112.

<Message Information Output Unit>

The message information output unit 116 is additionally provided. The message information output unit 116 generates information of a message which is superimposed on an image and displayed, and the message information output unit 116 outputs the information to the display control unit 118. For example, in a case where an alternative display target object is selected on account of restriction of a region of an image captured by the image pickup unit 102, as described later, the message information output unit 116 generates information of a message prompting a user to change a region of the image by moving the image pickup unit 102, and the message information output unit 116 outputs the information to the display control unit 118.

<Display Control Unit>

The display control unit 118 superimposes the virtual object which is a display target object on the image captured by the image pickup unit 102. The superimposition uses the information outputted from the display target information output unit 114. The display control unit 118 also causes the display unit 120 to display the superimposed result as an AR application image. At this time, the display control unit 118 may generate a superimposed image where the display target object is disposed and transformed to be suitable for the position, posture and size of the real object reflected in the image, and the display control unit 118 may superimpose the superimposed image on the image. As described above, the superimposed image may be generated by the display target information output unit 114. When the superimposed image is generated, the display control unit 118 may use, for example, information indicating the positional relationship between the real object and the information processing apparatus 100. The positional relationship is detected by the positional relationship detection unit 108. In a case where the message information output unit 116 is provided, the display control unit 118 superimposes a message on the image by further using information output from the message information output unit 116.

<Display Unit>

The display unit 120 presents the AR application image to a user. The AR application image is generated by the display control unit 118. As described above, the display unit 120 is realized by various display devices which are formed integrally with or separately from the information processing apparatus 100. The display unit 120 may be, for example, a display screen using an LCD (Liquid Crystal Display), an OLED (Organic Light-Emitting Diode) or a PDP (Plasma Display Panel), or a see-through type or a non-see-through type HMD (Head Mounted Display) which is installed by a user.

As described above, in the information processing apparatus 100 according to the present embodiment, a display target object is selected according to a positional relationship between a real object and the information processing apparatus 100. Also, the display target object is selected from a virtual object group including a plurality of kinds of virtual objects related to the real object. In addition, here, the "plurality of kinds of virtual objects" are virtual objects where a superimposed image is generated according to a plurality of pieces of image data (in other words, original data) which are different from each other. The plurality of pieces of image data are stored in the object DB 112, such as, for example, an "image which looks as if it exists in an inner space of a real object" or an "image which looks as if it protrudes from a real object". In addition, the "virtual object" is an object indicating additional information (annotation) for a real object as described above.

1-3. Example of Display Change

Figure 3:
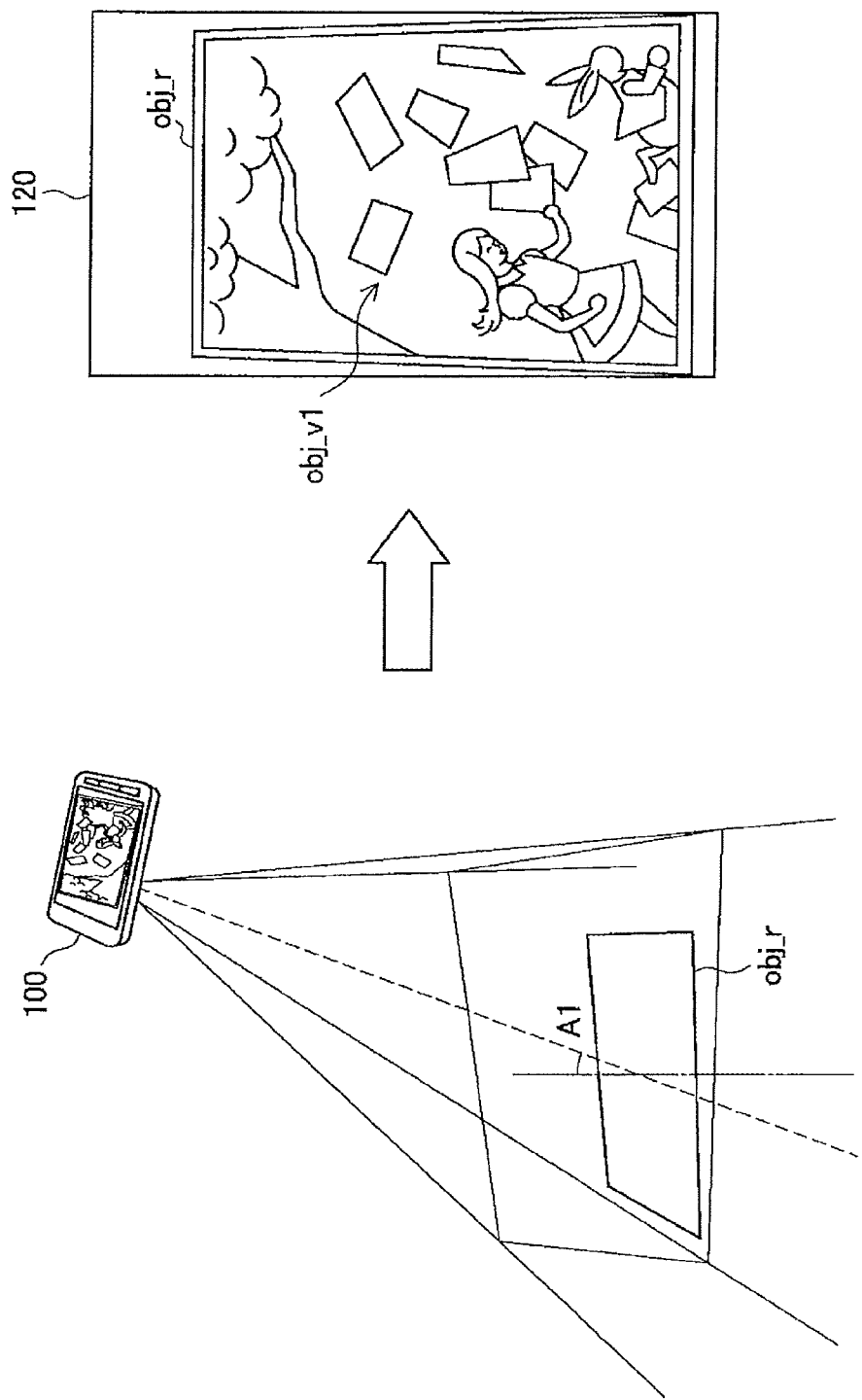
FIG. 3 is a diagram illustrating a first state where a virtual object is displayed by the information processing apparatus according to the first embodiment of the present disclosure.
Figure 4:
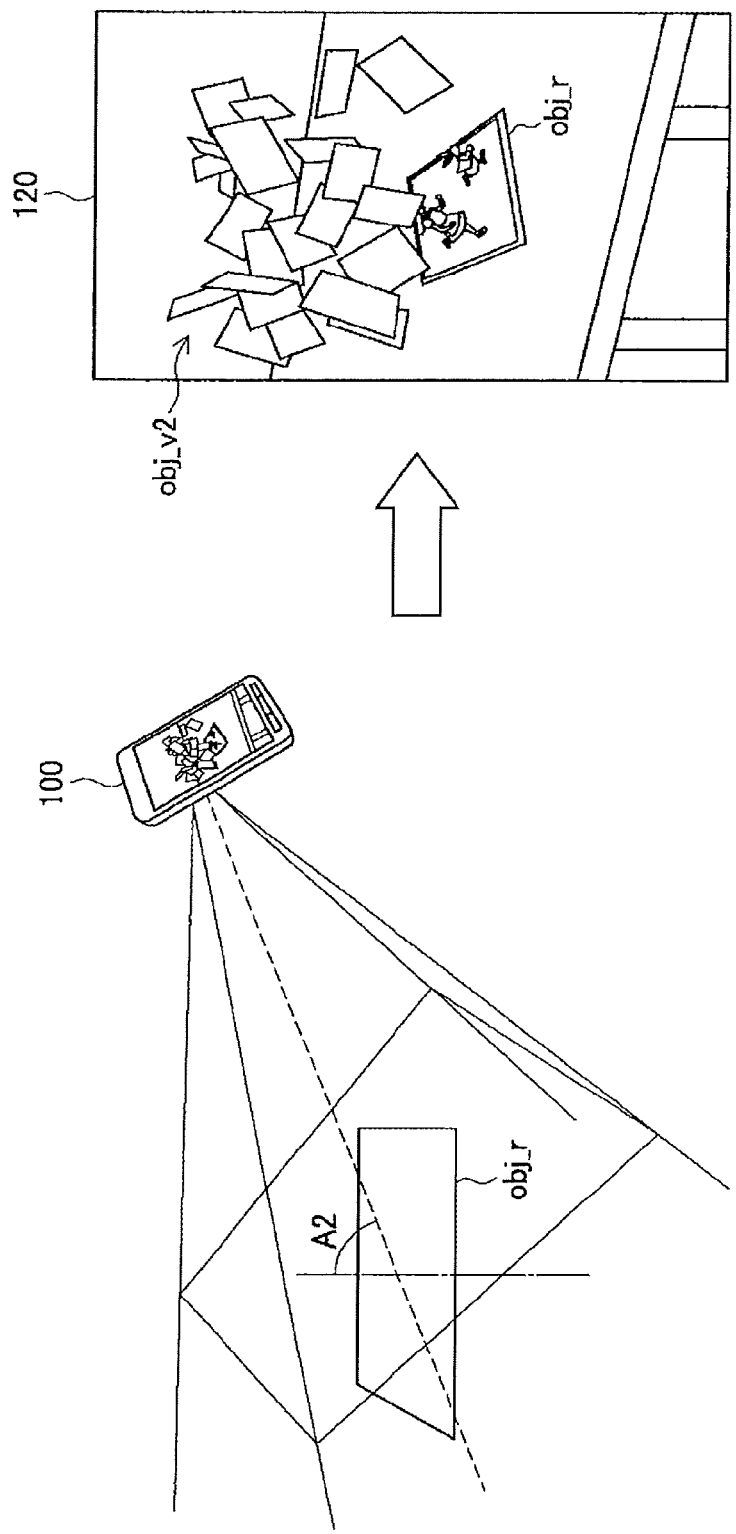
FIG. 4 is a diagram illustrating a second state where a virtual object is displayed by the information processing apparatus according to the first embodiment of the present disclosure.

Next, an example of the display change according to the present embodiment will be described with reference to FIGS. 3 to 5. FIG. 3 is a diagram illustrating a first state where a virtual object is displayed by the information processing apparatus according to the first embodiment of the present disclosure. FIG. 4 is a diagram illustrating a second state where a virtual object is displayed by the information processing apparatus according to the first embodiment of the present disclosure. FIG. 5 is a diagram illustrating a change in display of a virtual object by the information processing apparatus according to the first embodiment of the present disclosure.

FIG. 3 shows the first state where a virtual object is displayed by the information processing apparatus 100 according to the present embodiment. As described above, in the present embodiment, the kind of virtual object which is a display target is selected according to an angle of a real object relative to the information processing apparatus 100. In the shown example, in the first state, since an angle A1 of the real object obj_r (a book) relative to the information processing apparatus 100 is relatively small, a virtual object obj_v1 (an image regarding a content of the book) which looks as if it exists in an inner space of the real object obj_r is displayed. In the following description, display of the virtual object when the real object obj_r is reflected in the image in a state close to front view is referred to as "front view display".

Here, an angle A of the real object obj_r relative to the information processing apparatus 100 may be expressed as a tilt of a posture of the real object obj_r from a reference posture when a line of sight direction from the image pickup unit 102 of the information processing apparatus 100 is used as a reference. The reference posture of a real object is, for example, a posture which is defined in advance for each real object, and may be a posture of a real object according to the above-described model coordinate system. In the real object obj_r (a book) in the shown example, a posture where the cover thereof faces the image pickup unit 102 is set as the reference posture. Here, since the real object obj_r has a plate shape, an angle A is defined as an angle formed by a line perpendicular to the surface and a line of sight from the image pickup unit 102. In addition, a shape of the real object obj_r is not limited to the plate shape, and may be any shape. Therefore, the angle A of the real object obj_r relative to the information processing apparatus 100 may be defined variously in addition to the shown example.

FIG. 4 shows the second state where a virtual object is displayed by the information processing apparatus 100 according to the present embodiment. In the shown example, in the second state, since an angle A2 of the real object obj_r (a book) relative to the information processing apparatus 100 is relatively large, a virtual object obj_v2 (an image regarding a content of the book) which looks as if it protrudes from the real object obj_r is displayed. In the following description, the display of virtual object when the real object obj_r is reflected in the image in a state of oblique view is referred to as "oblique view display".

As such, in the present embodiment, the virtual object obj_v1 and the virtual object obj_v2 of which display positions relative to the real object obj_r are different from each other are selectively displayed according to a positional relationship between the information processing apparatus 100 and the real object obj_r. In the shown example, the virtual object obj_v1 and the virtual object obj_v2 have different positions in the depth direction when the surface of the real object obj_r is used as a reference surface. More specifically, in a case where the real object obj_r is reflected in the image in a state close to front view, the virtual object obj_v1 which looks as if it is reflected in the real object obj_r and exists therein is displayed. On the other hand, in a case where the real object obj_r is reflected in the image in a state of oblique view, the virtual object obj_v2 which looks as if it protrudes from the surface of the real object obj_r is displayed.

Thereby, a user can be presented the virtual object obj_v which is easily visually recognized and where a relationship with the real object obj_r is also easily understood, so as to be suitable for each posture even in a case where a posture of the real object obj_r reflected on an image is variously changed. In addition, here, although an example where a display target object is selected from a virtual object group including the virtual object obj_v1 in the front view display and the virtual object obj_v2 in the oblique view display has been described, virtual objects included in the virtual object group are not limited to these two kinds. For example, more kinds of virtual objects may be included in the virtual object group, and display target objects may be changed in more steps according to a posture relationship between a real object and the information processing apparatus 100. Further, the changes of the positional relationship between the virtual and real object may be performed linearly or non-linearly.

FIG. 5 shows an example of the change in display of a virtual object by the information processing apparatus 100 according to the present embodiment. As described above, in the present embodiment, display of a virtual object by the information processing apparatus 100 is varied depending on an angle of a real object relative to the information processing apparatus 100. In addition, in the example described here, an angle A of a plate-shaped real object obj_r relative to the information processing apparatus 100 is defined as an angle formed by a line perpendicular to the surface of the real object obj_r and a line of sight from the image pickup unit 102 of the information processing apparatus 100. FIG. 5 is a diagram illustrating a positional relationship between the information processing apparatus 100 and the real object obj_r through simplification only in one direction on the two-dimensional plane in relationships between the angle A and the front view display and the oblique view display of the virtual object. As will be readily apparent to a person skilled in the art, in practice, similar relationship is established for any direction on a three-dimensional space.

In the shown example, when the information processing apparatus 100 faces the real object obj_r, the angle A is 0(deg). In a state of A=0(deg), display of the virtual object is the front view display as in a case of the angle A=A1 shown in FIG. 3. If the information processing apparatus 100 is gradually tilted with respect to the real object obj_r from the state and the angle A exceeds a threshold value T1, the display of the virtual object is changed to the oblique view display as in a case of the angle A=A2 shown in FIG. 4. On the other hand, if the information processing apparatus 100 gradually comes close to the front surface of the real object obj_r from the state where the display of the virtual object is the oblique view display and the angle A becomes smaller than a threshold value T2, then the display of the virtual object is changed to the front view display.

As such, in the present embodiment, the kind of virtual object which becomes a display target object is selected using a threshold value set as an index value (the angle A) regarding a positional relationship between the information processing apparatus 100 and the real object obj_r. In a case where the image pickup unit 102 captures moving images and the kind of virtual object is selected for each of images forming consecutive frames, a different threshold value may be used depending on a virtual object which has been displayed until then, that is, the kind of virtual object selected in an image of the previous frame, such as the above-described threshold values T1 and T2. As such, by giving hysteresis to the selection of a virtual object, it is possible to prevent reduction in visibility occurring since display of the virtual object is frequently changed due to vibration of the angle A around a threshold value caused by camera shake, etc.

1-4. Example of Process Flow

Next, with reference to FIGS. 6 and 7, a description will be made of an example of the process flow performed by the information processing apparatus according to the present embodiment. FIG. 6 is a flowchart illustrating an example of the process flow of image display process in the information processing apparatus according to the first embodiment of the present disclosure. FIG. 7 is a flowchart illustrating an example of the process flow of display target setting process in the information processing apparatus according to the first embodiment of the present disclosure.

FIG. 6 is a flowchart illustrating an image display process according to the present embodiment. The image display process described here is a series of processes performed until a virtual object is superimposed on the image so as to be displayed after the information processing apparatus 100 acquires an image for a real space. In the shown example, the image pickup unit 102 captures moving images, and thus the image display process is repeatedly performed for the respective images forming the consecutive frames.

First, in step S101, the image pickup unit 102 acquires an image. Here, the acquired image is an image which is obtained by capturing a real space and is reflecting a real object obj_r therein.

Next, in step S103, the image recognition unit 104 performs object recognition for the acquired image. Here, the image recognition unit 104 recognizes the real object obj_r reflected in the image by the use of the model data stored in the model DB 106.

Next, in step S105, the positional relationship detection unit 108 detects a positional relationship between the information processing apparatus 100 and the real object obj_r. Here, the positional relationship detection unit 108 detects an angle A of the real object obj_r relative to the information processing apparatus 100.

Next, in step S107, the selection unit 110 determines whether or not the positional relationship between the information processing apparatus 100 and the real object obj_r is varied as compared with an image of the previous frame. The positional relationship is indicated by the angle A. If the positional relationship is varied, then the selection unit 110, in step S109, selects a display target object on the basis of the positional relationship after being varied. On the other hand, if the positional relationship is not varied, since the kind of virtual object selected as a display target object for the image of the previous frame is continuously used, the selection unit 110 skips step S109.

In addition, a display target selection process in step S109 will be described later with reference to FIG. 7.

Next, in step S111, the display target information output unit 114 outputs information related to the display target object selected by the selection unit 110 to the display control unit 118.

Next, in step S113, the display control unit 118 superimposes the virtual object on the image so as to be displayed on the display unit 120 according to the information of the display target object outputted from the display target information output unit 114. Thereby, the image on which the virtual object appropriately selected by the selection unit 110 is superimposed is presented to a user as an AR application image.

FIG. 7 is a flowchart illustrating a display target setting process according to the present embodiment. The display target setting process described here is a process performed in step S109 of the image display process as described above. In the shown example, the image pickup unit 102 captures moving images, and thus the display target setting process may be also performed for the respective images forming the consecutive frames.

First, in step S201, the selection unit 110 determines whether or not the display of virtual object in the previous frame is the front view display. As described above, the front view display is a display of the virtual object obj_v1 which looks as if it exists in an inner space of the real object obj_r when the real object obj_r is reflected in the image in a state close to front view.

Here, if the display of the virtual object in the previous frame is the front view display, then the selection unit 110, in step S203, sets a threshold value T1 as a threshold value of the angle A used to determine a continuous display target. On the other hand, if the display of the virtual object in the previous frame is not the front view display, that is, the display is the oblique view display, the selection unit 110, in step S205, sets a threshold value T2 as the threshold value. As described with reference to FIG. 5, the threshold values T1 and T2 of the angle A in the present embodiment has a relationship of T2<T1. Thereby, it is possible to select a display target object having hysteresis.

Next, in step S207, the selection unit 110 determines whether or not the angle A detected by the positional relationship detection unit 108 is equal to or less than the threshold value set in step S203 or step S205.

Here, if it is determined that the angle A is equal to or less than the threshold value, that is, the real object obj_r is reflected in the image in a state close to front view, in step S209, the selection unit 110 sets the virtual object in the front view display as a display target. On the other hand, if it is not determined that the angle A is equal to or less than the threshold value, that is, the real object obj_r is reflected in the image in a state of oblique view, in step S211, the selection unit 110 sets the virtual object in the oblique view display as a display target.

As above, the display target setting process finishes, and information of the set display target object is output to the display control unit 118 by the display target information output unit 114.

1-5. Example of Alternative Selection and Message Display

Figure 8B:
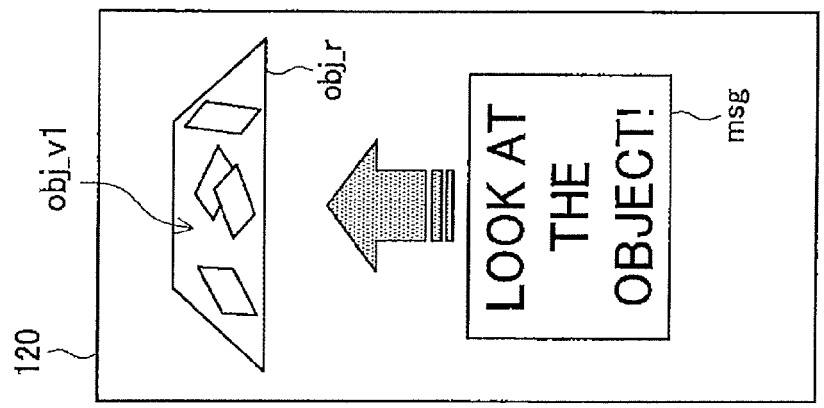
FIG. 8 is a diagram illustrating an example of the alternative selection and the message display according to the first embodiment of the present disclosure.
Figure 8A:
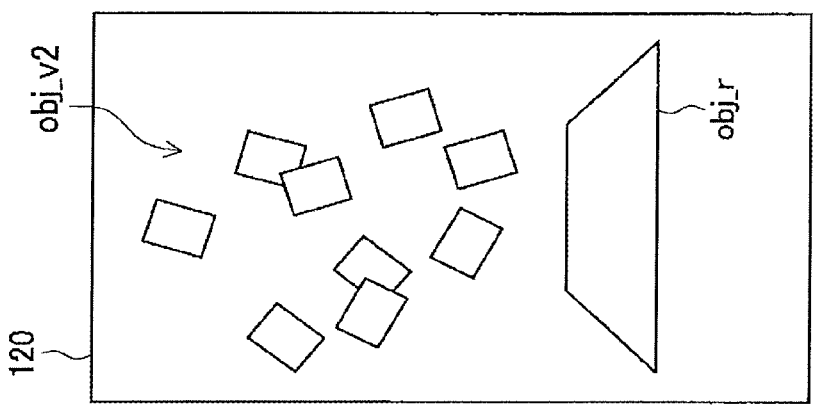

Next, with reference to FIG. 8, an example of the alternative selection and message display according to the present embodiment will be described. FIG. 8 is a diagram illustrating an example of the alternative selection and message display according to the first embodiment of the present disclosure.

FIG. 8 shows a diagram for comparison of a case where alternative selection and message display are performed and a case where they are not performed. In the case shown in (a) of FIG. 8, the real object obj_r is reflected in the image in a state of oblique view. Therefore, the virtual object obj_v2 which looks as if it protrudes from the real object obj_r is displayed.

On the other hand, in the case shown in (b) of FIG. 8, the real object obj_r is reflected in the image in a state of oblique view in similar manner as (a) of FIG. 8. However, in (b) of FIG. 8, since the real object obj_r is reflected close to the end of the screen, if the virtual object obj_v2 is to be displayed as in (a) of FIG. 8, a display position of the virtual object obj_v2 would exceed the image effective region. Therefore, the selection unit 110 selects the virtual object obj_v1 which can be displayed in the image effective region as a display target regardless of the determination result obtained for the angle A of the real object obj_r relative to the information processing apparatus 100.

Thereby, it is possible to prevent the virtual object from not being visually recognized by a user because display of the virtual object exceeds the image region. However, the display of the virtual object obj_v2 in a state of (b) of FIG. 8 is not necessarily in a state easily visually recognized by a user, for example, since the size thereof is significantly transformed according to the tilt of the surface of the real object obj_r. In addition, in this state, it is difficult to let the user know that the virtual object obj_v2 can be displayed as in (a) of FIG. 8.

Therefore, in the shown example, a message msg based on information generated by the message information output unit 116 is superimposed on the image so as to be displayed. The message msg may be a message which prompts the user to pay attention to the real object obj_r so as to change the image region accordingly and be guided to a state where the virtual object obj_v2 which is to be originally selected can be displayed, such as, for example, "LOOK AT THE OBJECT!". In addition, the message information output unit 116 may output, as message information, information for designating a display position of the message msg which is adjusted so as not to overlap the virtual object obj_v1.

In the above example, for example, an image of an icon or the like may be displayed instead of the message. In addition, a notification may be provided to a user through lighting or blinking of an LED (Light-Emitting Diode) lamp included in the information processing apparatus 100 or output of audio from the information processing apparatus 100. In other words, the message information output unit 116 in the present embodiment is an example of the notification unit which sends a notification to a user so as to vary an image region when an alternative display target object is selected. This notification may be performed through changes in display by the message information output unit 116, the display control unit 118, and the display unit 120 as in the above-described example. The notification also may be performed by a visual notification unit such as a lamp, or may be performed by an audio notification unit such as a speaker.

As above, the first embodiment of the present disclosure has been described. In the first embodiment of the present disclosure, a display position of a real object relative to a virtual object is changed depending on a positional relationship between the real object reflected in an image and a device capturing the image. Although an angle is used as the positional relationship in the above-described example, other positional relationships may be used. For example, a distance between a real object and a device may be used as the positional relationship. In this case, for example, if a distance between a real object and a device is shorter than a predetermined distance and thus the real object is displayed so as to be relatively large, a virtual object may be displayed in the real object, and, conversely, if the real object is displayed so as to be relatively small, the virtual object may protrude outwardly from the real object.

According to the first embodiment of the present disclosure, for example, a virtual object which is displayed at a position which gives the most comfortable viewing can be superimposed on an image so as to be presented to a user in each case according to a positional relationship between a real object and a device.

2. Second Embodiment

Next, the second embodiment of the present disclosure will be described with reference to FIGS. 9 to 11. In the second embodiment of the present disclosure, an amount of information displayed by a virtual object is changed depending on a positional relationship between a real object reflected in an image and a device capturing the image.

In addition, in a configuration of the second embodiment, parts other than parts described in the following are similar to those of the first embodiment. The configuration of these parts can be sufficiently described by appropriately replacing the description of the first embodiment according to the following description, and thus repeated detailed description thereof will be omitted.

Here, an example of a change in display according to the present embodiment will be described FIGS. 9 to 11. FIG. 9 is a diagram illustrating a first state where a virtual object is displayed by an information processing apparatus according to a second embodiment of the present disclosure. FIG. 10 is a diagram illustrating a second state where a virtual object is displayed by the information processing apparatus according to the second embodiment of the present disclosure. FIG. 11 is a diagram illustrating a change in display of a virtual object by the information processing apparatus according to the second embodiment of the present disclosure.

Figure 9A:
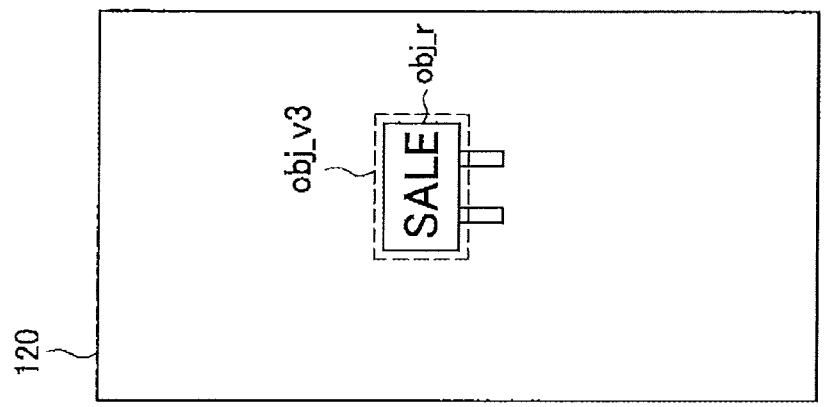
FIG. 9 is a diagram illustrating a first state where a virtual object is displayed by an information processing apparatus according to a second embodiment of the present disclosure.
Figure 9A:
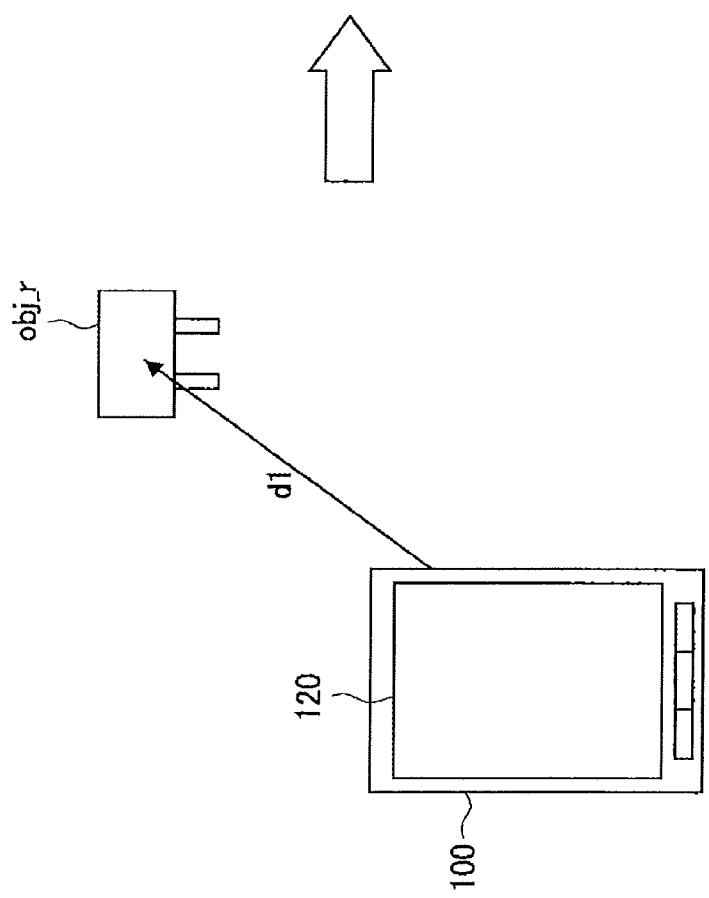

FIG. 9 shows the first state where a virtual object is displayed by the information processing apparatus 100 according to the present embodiment. In the present embodiment, the kind of virtual object which is a display target is selected according to a distance of a real object from the information processing apparatus 100. In the first state in the shown example, since the distance d1 from the information processing apparatus 100 to the real object obj_r (a signboard) is relatively long, and the real object obj_r reflected in the image is relatively small, a virtual object obj_v3 (only "SALE" is displayed) which displays a smaller amount of information is displayed. In the following description, display of a virtual object when such a smaller amount of information is displayed is referred to as "outline display".

Figure 10B:
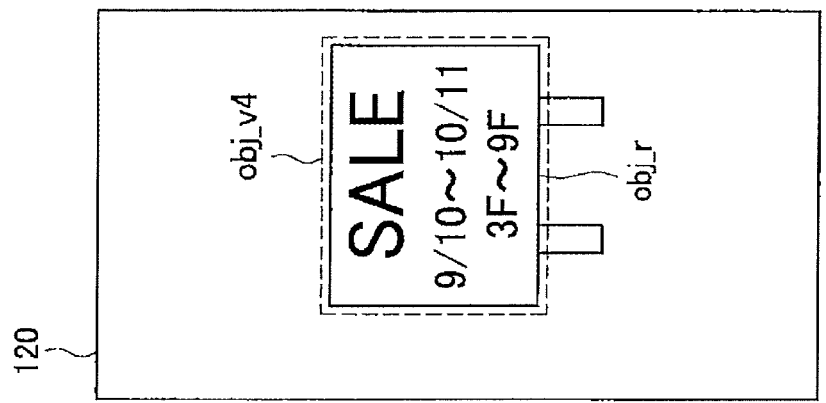
FIG. 10 is a diagram illustrating a second state where a virtual object is displayed by the information processing apparatus according to the second embodiment of the present disclosure.
Figure 10A:
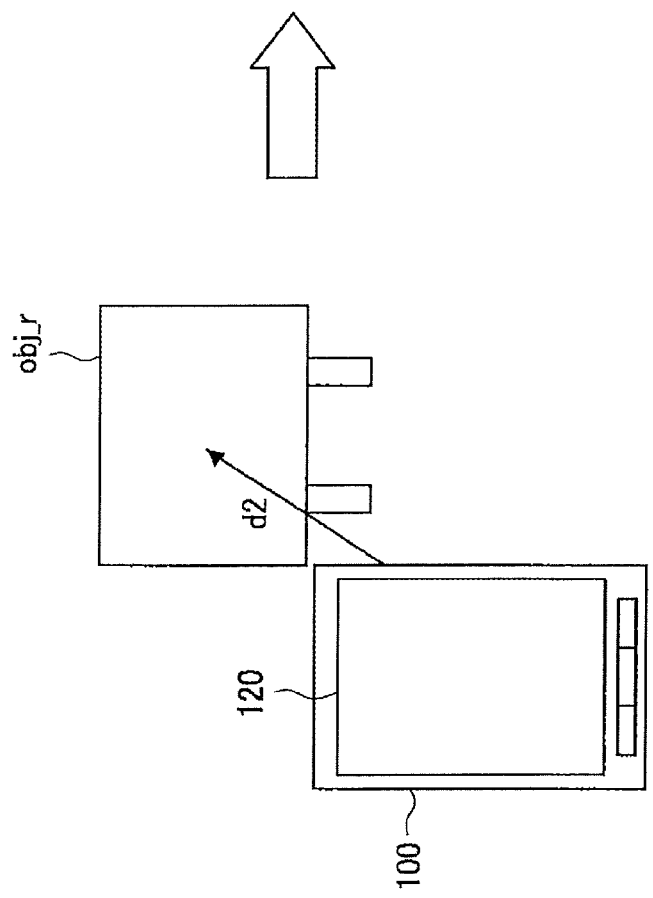
Figure 12B:
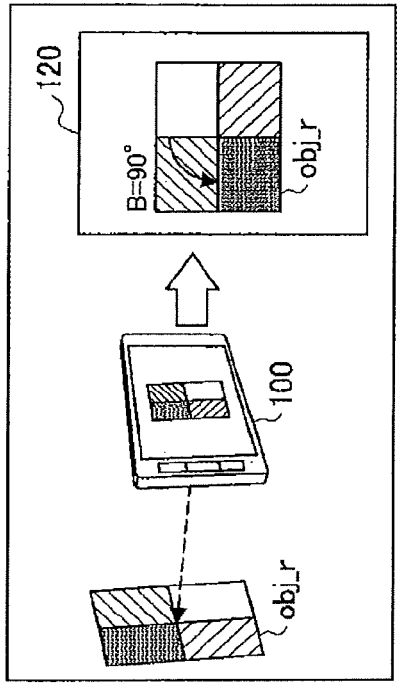
FIG. 12 is a diagram illustrating a positional relationship between a detected real object and a device according to a third embodiment of the present disclosure.
Figure 12C:
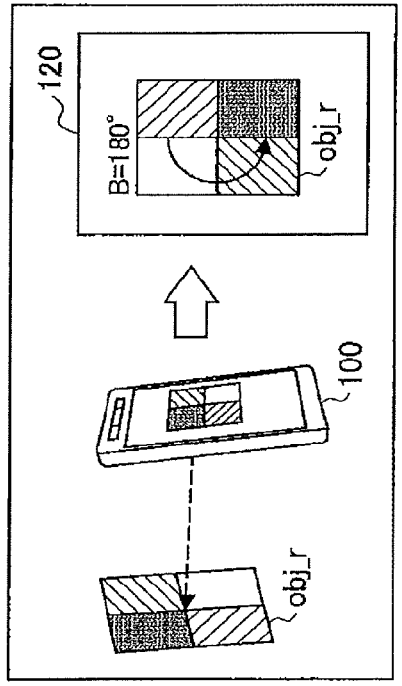
Figure 12A:
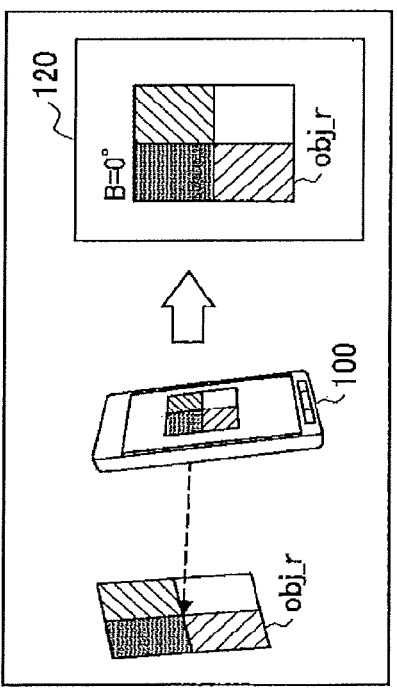
Figure 12D:
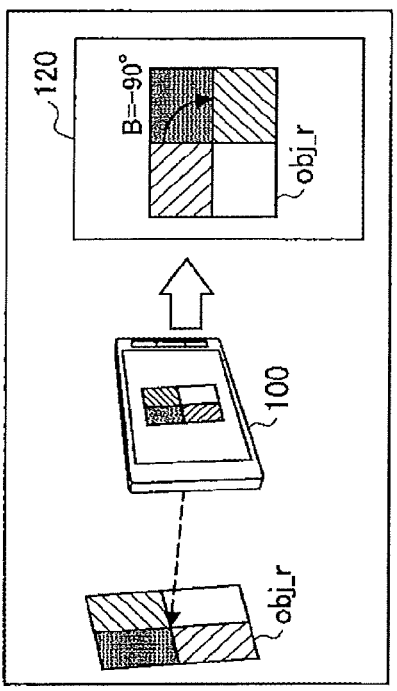

FIG. 10 shows the second state where a virtual object is displayed by the information processing apparatus 100 according to the present embodiment. In the second state in the shown example, since the distance d2 from the information processing apparatus 100 to the real object obj_r (a signboard) is relatively short, and the real object obj_r reflected in the image is relatively large, a virtual object obj_v4 (the time period or place is further displayed) which displays a larger amount of information is displayed. In the following description, display of a virtual object when such a larger amount of information is displayed is referred to as "detail display".

FIG. 11 shows an example of the change in display of a virtual object by the information processing apparatus 100 according to the present embodiment. As described above, in the present embodiment, the display of the virtual object by the information processing apparatus 100 is changed depending on the distance d from the information processing apparatus 100 to the real object. FIG. 11 is a diagram illustrating a positional relationship between the information processing apparatus 100 and the real object obj_r through simplification only in one direction on the two-dimensional plane in relationships between the distance d and the detail display and outline display of the virtual object. As will be readily apparent to a person skilled in the art, in practice, similar relationship is established for any direction on a three-dimensional space.

In the shown example, when the information processing apparatus 100 is closest to the real object obj_r, the distance d is 0. In a state of the distance d=0, display of the virtual object is the detail display as in a case of the distance d=d1 shown in FIG. 9. If the information processing apparatus 100 becomes distant from the real object obj_r from the state and the distance d exceeds a threshold value L1, the display of the virtual object is changed to the outline display as in a case of the distance d=d2 shown in FIG. 10. On the other hand, if the information processing apparatus 100 gradually comes close to the real object obj_r from the state where the display of the virtual object is the outline display, and then the distance d becomes smaller than a threshold value L2, the display of the virtual object is changed to the detail display.

As such, in the present embodiment, the kind of virtual object which becomes a display target object is selected using a threshold value set as a parameter (the distance d) regarding a positional relationship between the information processing apparatus 100 and the real object obj_r. In a case where the image pickup unit 102 captures moving images and the kind of virtual object is selected for the respective images forming consecutive frames, a different threshold value may be used depending on a virtual object which has been displayed until then, that is, the kind of virtual object selected in the previous frame, such as the above-described threshold values L1 and L2. In this manner, by giving hysteresis to the selection of a virtual object, it is possible to prevent reduction in visibility occurring since display of the virtual object is frequently changed due to vibration of the distance d around a threshold value caused by camera shake or the like.

As above, the second embodiment of the present disclosure has been described. In the second embodiment of the present disclosure, an amount of information displayed by a virtual object is changed depending on a positional relationship between the real object reflected in an image and a device capturing the image. Although a distance is used as the positional relationship in the above-described example, other positional relationships may be used. For example, an angle of a real object relative to a device may be used as the positional relationship. In this case, for example, if a surface of the real object is viewed nearly from the front side and thus the display area is large, a virtual object displaying more information may be displayed, and, conversely, if the surface of the real object is viewed obliquely and thus the display area is small, a virtual object displaying less information may be displayed.

According to the second embodiment of the present disclosure, for example, a virtual object which effectively displays an amount of information which gives the most comfortable viewing can be superimposed on an image so as to be presented to a user in each case according to a positional relationship between a real object and a device.

3. Third Embodiment

Subsequently, the third embodiment of the present disclosure will be described with reference to FIGS. 12 to 16. In the third embodiment of the present disclosure, the kind of information displayed by a virtual object is changed depending on a positional relationship between a real object reflected in an image and a device capturing the image.

In addition, in a configuration of the third embodiment, parts other than parts described in the following are similar to those of the first embodiment. A configuration of these parts can be sufficiently described by appropriately replacing the description of the first embodiment according to the following description, and thus repeated detailed description thereof will be omitted.

3-1. Example of Detected Positional Relationship

First, an example of the positional relationship between a real object and a device detected according to the present embodiment will be described with reference to FIG. 12. FIG. 12 is a diagram illustrating a positional relationship between a real object and a device detected according to the third embodiment of the present disclosure.

FIG. 12 shows four examples (a)-(d) illustrating a detected positional relationship in the present embodiment. In the present embodiment, a rotation angle B of the real object obj_r reflected in the image is detected as a positional relationship between the information processing apparatus 100 and the real object obj_r. For example, in a state shown in (a) of FIG. 12, the image pickup unit 102 captures an image including the real object obj_r in a state where the information processing apparatus 100 is erected. In the shown example, in this case, the rotation angle B is 0(deg). Here, if the information processing apparatus 100 is rotated in a clockwise direction by 90(deg) from the state shown in (a) of FIG. 12 and enters a state shown in (b) of FIG. 12, the real object obj_r is displayed in a state of being rotated by the rotation angle B=90(deg) from the state shown in (a) of FIG. 12 in the image which is captured by the image pickup unit 102 and is displayed on the display unit 120.

Moreover, when the information processing apparatus 100 is rotated in a clockwise direction and enters a state shown in (c) of FIG. 12, the real object obj_r is displayed in a state of being rotated by the rotation angle B=180(deg) from the state shown in (a) of FIG. 12 in the image displayed on the display unit 120. On the other hand, when the information processing apparatus 100 is rotated in a counterclockwise direction by 90(deg) from the state shown in (a) of FIG. 12 and enters a state shown in (d) of FIG. 12, the real object obj_r is displayed in a state of being rotated by the rotation angle B=−90(deg) from the state shown in (a) of FIG. 12 in the image displayed on the display unit 120.

In the present embodiment, the positional relationship detection unit 108 of the information processing apparatus 100 detects the rotation of the real object obj_r relative to the information processing apparatus 100 as the example described above, as a positional relationship of the real object and the information processing apparatus 100. More specifically, the positional relationship detection unit 108 detects a rotation of the real object obj_r of which an axis parallel to the image pickup axis of the image pickup unit 102 is rotated, as a positional relationship. Here, the image pickup axis of the image pickup unit 102 may be defined, for example, as an optical axis in a portion closest to the real object obj_r of optical systems of the image pickup unit 102.

In addition, one of differences between the present embodiment and the first and second embodiments is that the change in a positional relationship between the real object and the information processing apparatus 100 does not substantially change the display of the real object in an image.

For example, in the examples shown in FIG. 12, it can be said that the display of the real object obj_r is rotated in the coordinate system using the information processing apparatus 100 as a reference. However, in many cases, the changes in the states as shown in (a)-(d) of FIG. 12 occur in practice by a user changing a method of holding the information processing apparatus 100. In these cases, since the information processing apparatus 100 is rotated itself in a direction reverse to the rotation of the display of the real object obj_r in the display unit 120, the real object obj_r visually recognized by a user is not substantially rotated. For example, in the example shown in (c) of FIG. 12, the real object obj_r displayed on the display unit 120 is rotated by the rotation angle B=180(deg); however, if the information processing apparatus 100 itself is held by a user in a state of being rotated by 180(deg) from the initial posture, the display of the real object obj_r visually recognized by the user is the same as that shown in (a) of FIG. 12.

In other words, the present embodiment indicates that the technique related to the present disclosure is effective even in a case where it is not necessarily difficult for a user to visually recognize a real object or a virtual object due to a change in a positional relationship between the real object and the information processing apparatus 100.

3-2. Example of Display Change

Figure 13:
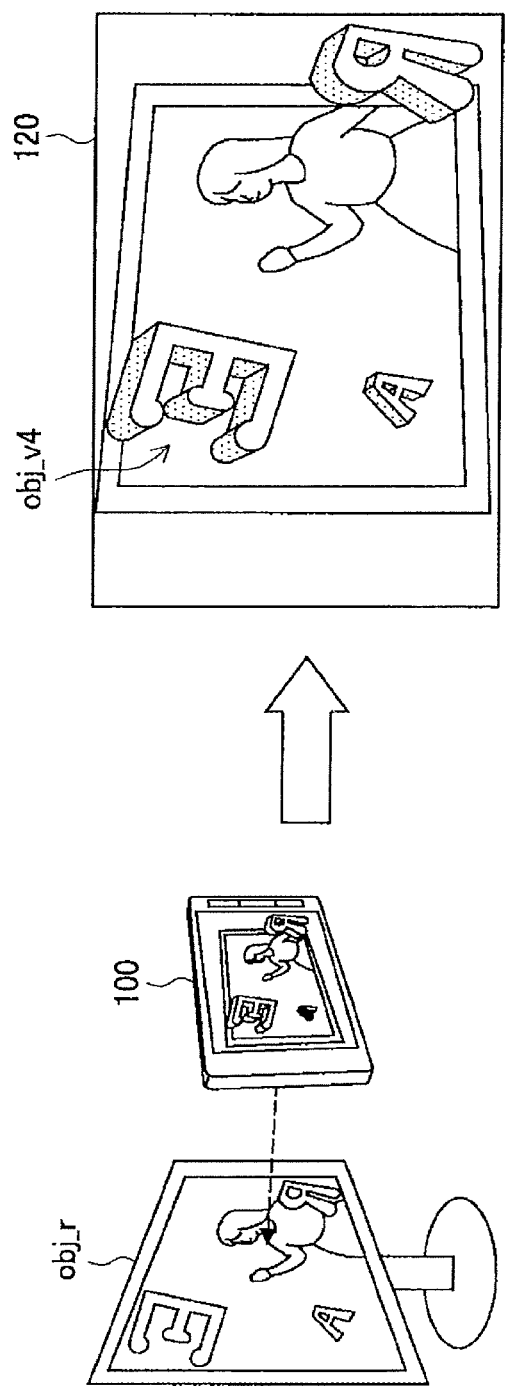
FIG. 13 is a diagram illustrating a first state where a virtual object is displayed by the information processing apparatus according to the third embodiment of the present disclosure.
Figure 14:
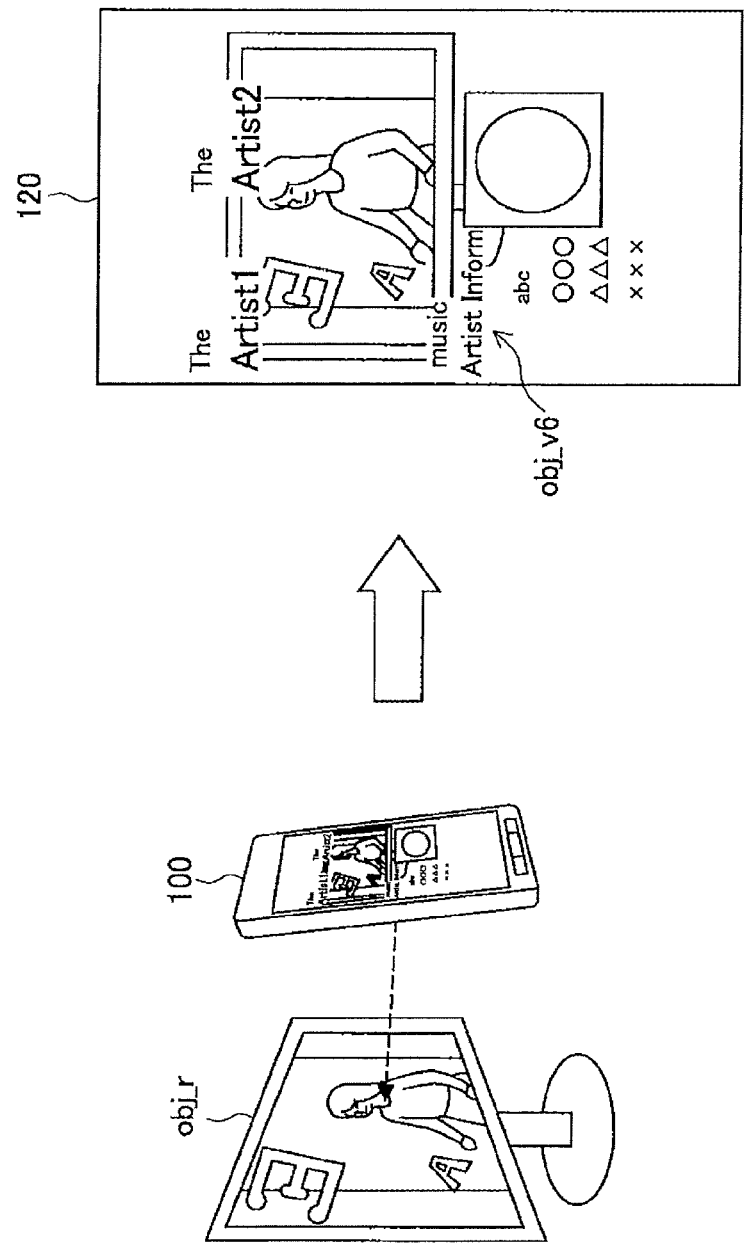
FIG. 14 is a diagram illustrating a second state where a virtual object is displayed by the information processing apparatus according to the third embodiment of the present disclosure.
Figure 15:
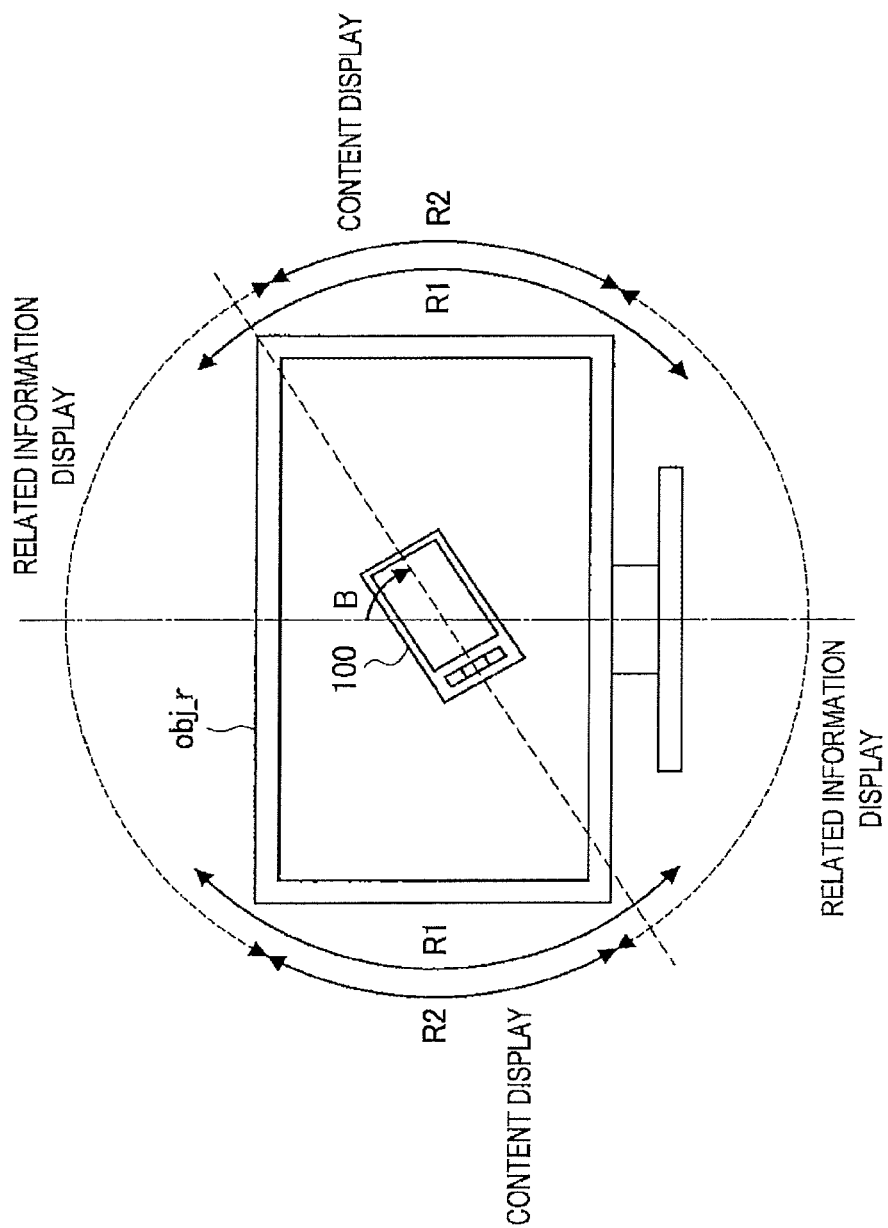
FIG. 15 is a diagram illustrating a change in display of a virtual object by the information processing apparatus according to the first embodiment of the present disclosure.

Next, an example of the display change according to the present embodiment will be described with reference to FIGS. 13 to 15. FIG. 13 is a diagram illustrating a first state where a virtual object is displayed by the information processing apparatus according to the third embodiment of the present disclosure. FIG. 14 is a diagram illustrating a second state where a virtual object is displayed by the information processing apparatus according to the third embodiment of the present disclosure. FIG. 15 is a diagram illustrating a change in display of a virtual object by the information processing apparatus according to the third embodiment of the present disclosure.

FIG. 13 shows the first state where a virtual object is displayed by the information processing apparatus 100 according to the present embodiment. As described above, in the present embodiment, the kind of virtual object which is a display target is selected according to a rotation of a real object relative to the information processing apparatus 100. In the first state in the shown example, the information processing apparatus 100 is in a state of being placed horizontally to the real object obj_r (monitor). In this case, the display content (details) of the real object obj_r is displayed as a virtual object obj_v5 so as to protrude from the real object obj_r. In the following description, such display of the virtual object is also referred to as "content display".

FIG. 14 shows the second state where a virtual object is displayed by the information processing apparatus 100 according to the present embodiment. In the second state in the shown example, the information processing apparatus 100 is in a state of being placed vertically to the real object obj_r (monitor). In this case, information related to the display content (details) of the real object obj_r is displayed as a virtual object obj_v6 so as to protrude from the real object obj_r. In the following description, such display of the virtual object is also referred to as "related information display".

FIG. 15 shows an example of the change in display of a virtual object by the information processing apparatus 100 according to the present embodiment. As described above, in the present embodiment, the display of a virtual object by the information processing apparatus 100 is changed depending on a rotation of a real object relative to the information processing apparatus 100. In the present embodiment, a range is set to a rotation angle, and the kind of information displayed by a virtual object is changed depending on the range.

In the shown example, the information processing apparatus 100 is in a state of being placed vertically to the real object obj_r, and a rotation angle B of the real object obj_r relative to the information processing apparatus 100 is detected using a state where the information processing apparatus 100 is erected as a reference. A range R1 or a range R2 is set for the detected rotation angle B, and the virtual object is displayed as the content display if the rotation angle B is within this range. On the other hand, if the rotation angle B is out of this range, a virtual object is displayed as the related information display.

Here, the range R1 and the range R2 are ranges of a rotation angle of the real object obj_r where the information processing apparatus 100 is determined as being in a state of being placed horizontally to the real object obj_r. Therefore, both the range R1 and the range R2 may be ranges around, for example, +/−90(deg). In addition, the range R1 is used in a case where display of a virtual object is the content display, and the range R2 is used in a case where a virtual object is the related information display. In other words, the range R2 where the content display is continued to be performed in a state where the content display has already been performed is greater than the range R1 of being changed to the content display from a state where the related information display is performed. As such, by giving hysteresis to the selection of a virtual object, it is possible to prevent reduction in visibility occurring since display of the virtual object is frequently changed due to vibration of the rotation angle B around a boundary of the range caused by camera shake or the like.

3-3. Example of Process Flow

Figure 16:
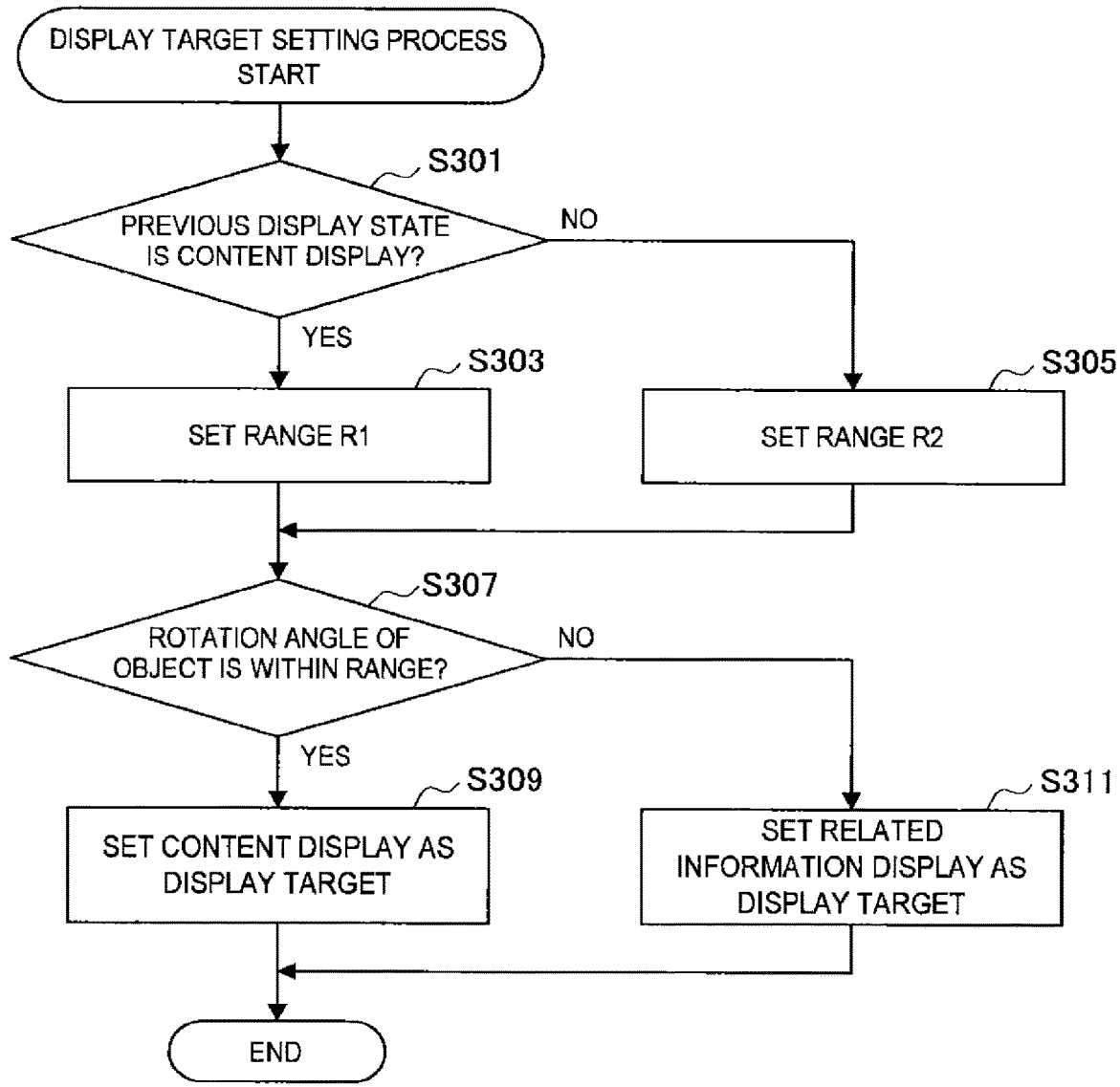
FIG. 16 is a flowchart illustrating an example of the process flow of display target setting process in the information processing apparatus according to the third embodiment of the present disclosure.

Next, with reference to FIG. 16, a description will be made of an example of the process flow performed by the information processing apparatus according to the present embodiment. FIG. 16 is a flowchart illustrating an example of the process flow of display target setting processes in the information processing apparatus according to the third embodiment of the present disclosure.

FIG. 16 is a flowchart illustrating the display target setting process in the present embodiment. The display target setting process described here is a process performed in step S109 of the image display process similar to that described with reference to FIG. 6. In the shown example, the image pickup unit 102 captures moving images, and thus the display target setting process may be also performed for the respective images forming the consecutive frames.

First, in step S301, the selection unit 110 determines whether or not display of the virtual object in the previous frame is the content display. As described above, the content display is display of the virtual object obj_v5 which displays a content of the real object obj_r when the information processing apparatus 100 is placed horizontally to the real object obj_r.

Here, if the display of the virtual object in the previous frame is the content display, the selection unit 110 sets a range R1 as a range of the rotation angle B used to determine a continuous display target in step S303. On the other hand, if the display of the virtual object in the previous frame is not the content display, that is, the display is the related information display, the selection unit 110 sets a range R2 as the range, in step S305. As described with reference to FIG. 15, the ranges R1 and R2 of the rotation angle B in the present embodiment has a relationship that R1 is larger than R1. Thereby, it is possible to select a display target object having hysteresis.

Next, in step S307, the selection unit 110 determines whether or not the rotation angle B of the detected obj_r is within the range set in step S303 or step S305.

Here, if it is determined that the rotation angle B is within the range, that is, the information processing apparatus 100 is placed horizontally to the real object obj_r, the selection unit 110, in step S309, sets the virtual object in the content display as a display target. On the other hand, if it is determined that the rotation angle B is not within the range, that is, the information processing apparatus 100 is placed vertically to the real object obj_r, the selection unit 110, in step S311, sets the virtual object in the related information display as a display target.

As above, the display target setting process finishes, and information of the display target object set here is output to the display control unit 118 by the display target information output unit 114.

As above, the third embodiment of the present disclosure has been described. In the third embodiment of the present disclosure, the kind of information displayed by a virtual object is changed depending on a positional relationship between the real object reflected in an image and a device capturing the image. Although a rotation angle is used as the positional relationship in the above-described example, other positional relationships may be used. For example, an angle of a real object relative to a device may be used as the positional relationship. In this case, for example, if a surface of the real object is viewed nearly from the front side, a content of the real object may be displayed, and, conversely, if the surface of the real object is viewed obliquely, information related to the content of the real object may be displayed.

According to the third embodiment of the present disclosure, for example, by changing a positional relationship between a real object and a device, it is possible to change the kind of information displayed by a virtual object which is displayed with regard to the real object. For example, if a positional relationship is intentionally changed by a user, the user can use the change in a posture of the device as an instruction operation for changing display content. In addition, for example, if a positional relationship is unintentionally changed, the user can obtain the different kinds of information which has not been viewed before.

4. Other Embodiments Regarding Apparatus Configuration

Subsequently, other embodiments of the present disclosure regarding an apparatus configuration will be described with reference to FIGS. 17 and 18.

<Example Including Sensor Unit>

Figure 17:
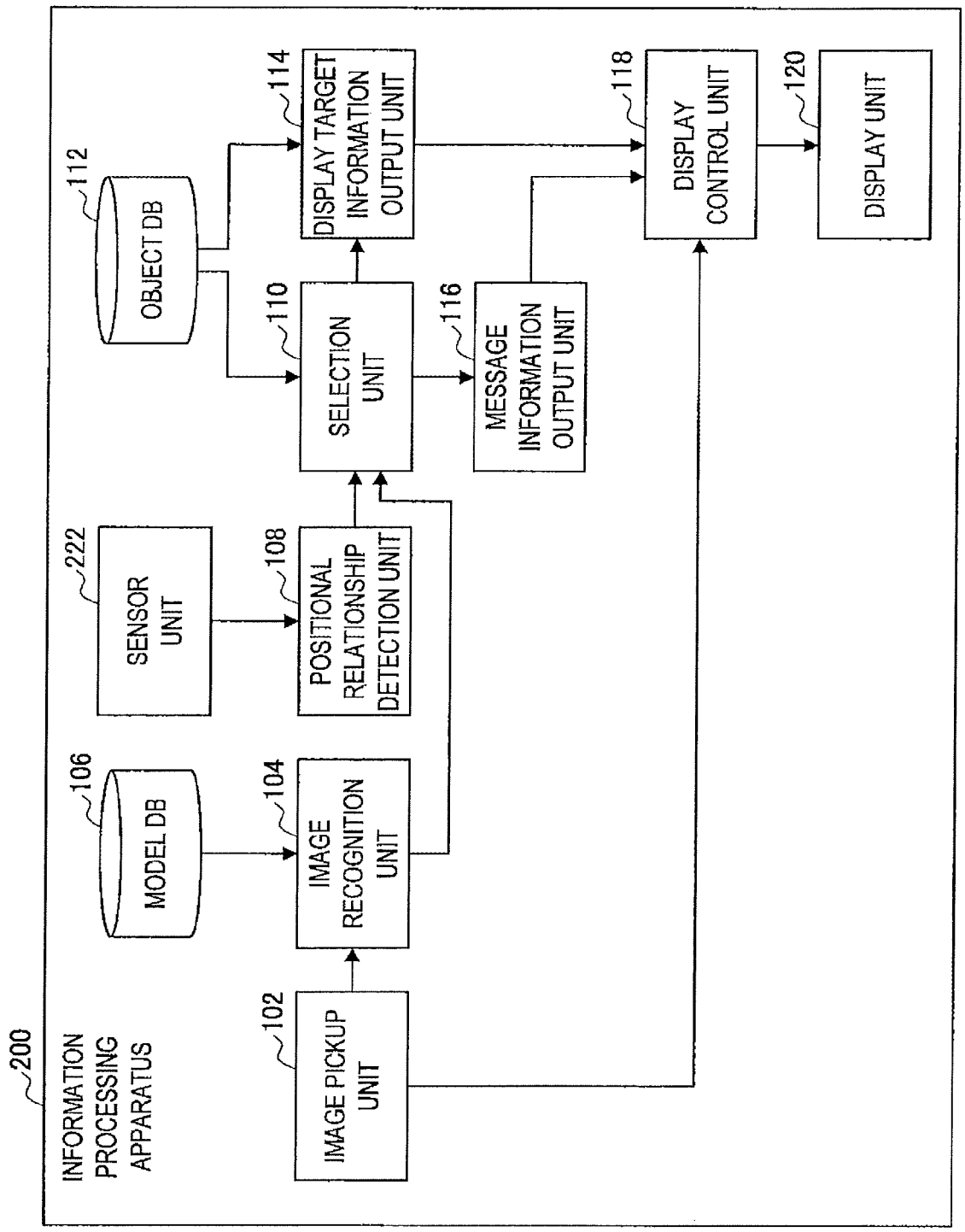
FIG. 17 is a block diagram illustrating another example of the functional configuration of an information processing apparatus according to an embodiment of the present disclosure.

FIG. 17 is a block diagram illustrating another example of the functional configuration of an information processing apparatus according to an embodiment of the present disclosure. Referring to FIG. 17, an information processing apparatus 200 includes a sensor unit 222 as well as an image pickup unit 102, an image recognition unit 104, a model DB 106, a positional relationship detection unit 108, a selection unit 110, an object DB 112, a display target information output unit 114, a message information output unit 116, a display control unit 118, and a display unit 120.

The sensor unit 222 includes a motion sensor group which measures a motion of the image pickup unit 102. The motion sensor may be, for example, an acceleration sensor which measures acceleration of the image pickup unit 102, a gyro sensor which measures a tilt angle, a geomagnetic sensor which measures the azimuth to which the image pickup unit 102 is oriented, or the like. In addition, the sensor unit 222 may include a GPS (Global Positioning System) sensor which receives a GPS signal and measures latitude, longitude and altitude of the apparatus.

In the shown example, the positional relationship detection unit 108 detects a positional relationship between a real object and the information processing apparatus 200 (more specifically, the image pickup unit 102) on the basis of the motion of the image pickup unit 102 acquired by the sensor unit 222. For example, the positional relationship detection unit 108 detects a posture of the information processing apparatus 200 on the basis of information of acceleration or tilt angle of the image pickup unit 102. If there is information of a position of a real object, whether or not the real object is on a horizontal plane such as the ground, or whether or not the real object is on a vertical plane such as a wall, it is possible to obtain a positional relationship with the real object by detecting a posture of the information processing apparatus 200. In addition, the positional relationship detection unit 108, as shown in the figure, may detect a positional relationship using information from the sensor unit 222, and may detect a positional relationship using information from the image recognition unit 104 together.

<Example of Server on Network>

Figure 18:
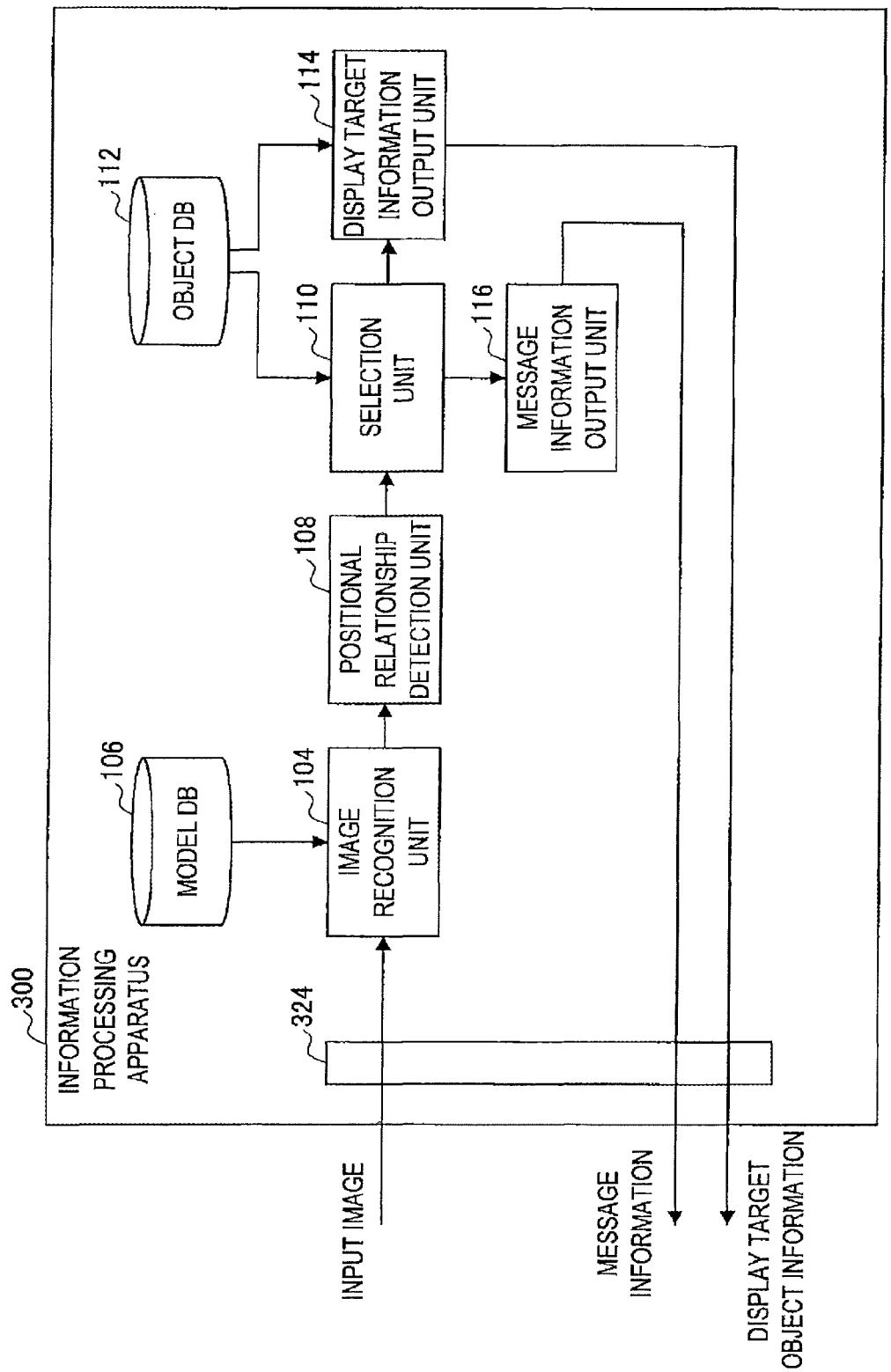
FIG. 18 is a block diagram illustrating further another example of the functional configuration of the information processing apparatus according to an embodiment of the present disclosure.

FIG. 18 is a block diagram illustrating still another example of the functional configuration of an information processing apparatus according to an embodiment of the present disclosure. Referring to FIG. 18, an information processing apparatus 300 includes an image recognition unit 104, a model DB 106, a positional relationship detection unit 108, a selection unit 110, an object DB 112, a display target information output unit 114, a message information output unit 116, and a communication unit 324.

In the shown example, the information processing apparatus 300 does not include the image pickup unit 102, the display control unit 118, and the display unit 120. The information processing apparatus 300 is, for example, a server installed on a network, and receives data of an image captured by the image pickup unit of an apparatus which is a client as an input image via the communication unit 324. In addition, the information processing apparatus 300 transmits information of a display target object output from the display target information output unit 114 and further information of a message output from the message information output unit 116, to the client via the communication unit 324. An image on which a virtual object is superimposed is generated, and the image is displayed in the display control unit of the terminal apparatus using the transmitted information.

As such, the information processing apparatus according to the embodiments of the present disclosure may not necessarily include the image pickup unit 102 or the display unit 120, and has various configurations. For example, in the above-described information processing apparatus 300, the display control unit 118 may be provided, and an image on which a virtual object is superimposed may be generated and transmitted to the client via the communication unit 324. Further, the information processing apparatus may not include the image pickup unit 102 but include the display unit 120, and superimpose a virtual object on an image captured by an external device so as to be displayed. Furthermore, the information processing apparatus may not include the image pickup unit 102 but include the display unit 120, and transmit an image where a virtual object is superposed on a captured image to an external device.

5. Supplement

<Hardware Configuration>

Figure 19:
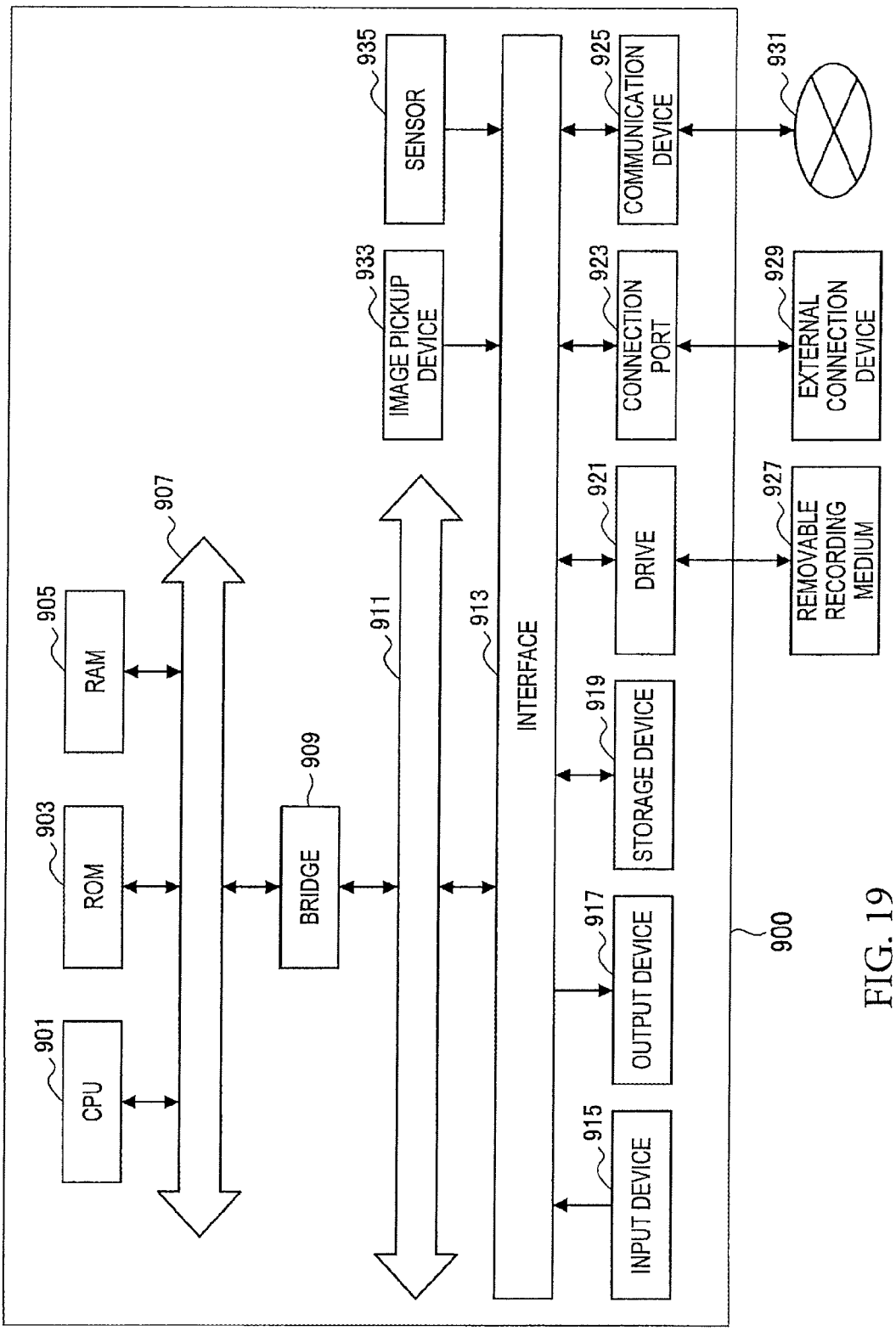
FIG. 19 is a block diagram illustrating a hardware configuration of the information processing apparatus.

Finally, with reference to FIG. 19, a description will be made of a hardware configuration of the information processing apparatus 900 capable of realizing the information processing apparatus according to the embodiments of the present disclosure. FIG. 19 is a block diagram illustrating a hardware configuration of the information processing apparatus.

The information processing device 900 includes a CPU (Central Processing Unit) 901, ROM (Read Only Memory) 903, and RAM (Random Access Memory) 905.

Further, the information processing device 900 may include a host bus 907, a bridge 909, an external bus 911, an interface 913, an input device 915, an output device 917, a storage device 919, a drive 921, a connection port 923, and a communication device 925. The information processing device 900 may include a processing circuit such as DSP (Digital Signal Processor) in addition to or instead of the CPU 901.

The CPU 901 functions as an arithmetic processing unit and a control unit, and controls the entire operation within the information processing device 900 or a part thereof in accordance with various programs recorded on the ROM 903, the RAM 905, the storage 919, or the removable recording medium 927. The ROM 903 stores programs, operation parameters, and the like used by the CPU 901. The RAM 905 temporarily stores programs used in the execution of the CPU 901, parameters that change as appropriate during the execution, and the like. The CPU 901, the ROM 903, and the RAM 905 are mutually connected by a host bus 907 constructed from an internal bus such as a CPU bus. Further, the host bus 907 is connected to the external bus 911 such as a PCI (Peripheral Component Interconnect/Interface) via the bridge 909.

The input device 915 is a device used by a user such as, for example, a mouse, a keyboard, a touch panel, a button, a switch, or a lever. The input device 915 may be, for example, a remote control device that uses infrared rays or other radio waves, or an external connection device 929 such as a portable phone corresponding to the operation of the information processing device 900. The input device 915 includes an input control circuit that generates an input signal based on information input by a user and outputs the input signal to the CPU 901. The user can, by operating the input device 915, input various data to the information processing device 900 or instruct the information processing device 900 to perform a processing operation.

The output device 917 includes a device that can visually or audibly inform a user of the acquired information. The output device 917 can be, for example, a display device such as an LCD (liquid crystal display), a PDP (Plasma Display Panel) an organic EL (Electro-Luminescence) display; an audio output device such as a speaker or headphones; or a printer device. The output device 917 outputs the result obtained through the processing of the information processing device 900 as text or video such as an image or as sound such as voice or audio.

The storage device 919 is a device for storing data, constructed as an example of a storage unit of the information processing device 900. The storage device 919 includes, for example, a magnetic storage device such as HDD (Hard Disk Drive), a semiconductor storage device, an optical storage device, or a magneto-optical storage device. This storage device 929 includes, for example, programs or various data executed by the CPU 901 or various data acquired from the outside.

The drive 921 is a reader/writer for a removable recording medium 927 such as a magnetic disk, an optical disc, a magneto-optical disk, or semiconductor memory, and is incorporated in or externally attached to the information processing device 900. The drive 921 reads information recorded on a removable recording medium 927 that is mounted, and outputs the information to the RAM 905. The drive 921 also writes information to the removable recording medium 927 that is mounted.

The connection port 923 is a port for directly connecting a device to the information processing device 900. The connection port 923 can be, for example, a USB (Universal Serial Bus) port, an IEEE 1394 port, or a SCSI (Small Computer System Interface) port. In addition, the connection port 923 may be an RS-232 port, an optical audio terminal, or a HDMI (High-Definition Multimedia Interface) port. When the external connection device 929 is connected to the connection port 923, the information processing device 900 and the external connection device 929 can exchange various data.

The communication device 925 is, for example, a communication interface including a communication device or the like for connection to a communications network 931. The communication device 925 can be, for example, a wired or wireless LAN (Local Area Network) or a communication card for Bluetooth (registered trademark) or WUSB (Wireless USB). Alternatively, the communication device 925 may be a router for optical communication, a router for ADSL (Asymmetric Digital Subscriber Line), or a modem for various communication. The communication device 925 transmits or receives signals or the like via the Internet or to/from other communication devices, for example, using a predetermined protocol such as TCP/IP. In addition, the communications network 931 connected to the communication device 925 is a network connected by wire or wirelessly, and is, for example, the Internet, a home LAN, infrared communication, radio wave communication, or satellite communication.

The image pickup device 933 is, for example, an apparatus which captures a real world and generates a captured image by using image sensor such as CCD (Charge Coupled Device) or CMOS (Complementary Metal Oxide Semiconductor) and various components such as lens for picking up a subject image to the image sensor. The image device 933 may be configured to pick up still images or moving images.

The sensor 935 may be various types of sensors such as an acceleration sensor, a gyro sensor, a geomagnetic sensor, an optical sensor, and an acoustic sensor. The sensor 935 acquires information related to the state of an information processing apparatus 900 such as the shape of housing of the information processing apparatus 900 and information related to surrounding environment of the information processing apparatus 900 such as brightness or noise in surroundings of the information processing apparatus 900. Moreover, the sensor 935 may include a GPS (Global Positioning System) sensor which receives a GPS signal and measures latitude, longitude and altitude of the apparatus.

An example of the hardware configuration of the information processing apparatus 900 has been described. The respective components described above may be configured using general purpose elements, and may be configured by hardware specialized to the function of the respective components. Such configurations can be appropriately changed according to the technical level at the time of implementing the present embodiments.

Although preferred embodiments of the present disclosure are described in detail above with reference to the appended drawings, the disclosure is not limited thereto. It should be understood by those skilled in the art that various modifications, combinations, sub-combinations and alterations may occur depending on design requirements and other factors insofar as they are within the scope of the appended claims or the equivalents thereof.

Additionally, the following configurations are also within the technical scope of the present disclosure.

(1) An apparatus including:
an image processor configured to
receive a video including an object,
determine a positional relationship between the apparatus and the object,
change a positional relationship between an image superimposed on the video and the object when the positional relationship between the apparatus and the object changes.

(2) The apparatus according to (1), wherein the image processor determines an angle between a direction of the object and a direction of the apparatus and changes the positional relationship between the image superimposed on the video and the object based on the angle.

(3) The apparatus according to (2), wherein the image processor determines that the positional relationship between the image superimposed on the video and the object is a front view relationship when the angle is below a first threshold angle.

(4) The apparatus according to (3), wherein the image processor changes the positional relationship between the image superimposed on the video and the object from the front view relationship to an oblique view relationship when the angle exceeds the first threshold angle.

(5) The apparatus according to (4), wherein the image processor changes the positional relationship between the image superimposed on the video and the object from the oblique relationship to the front view relationship when the angle drops below a second threshold angle.

(6) The apparatus according to (5), wherein the second threshold angle is lower than the first threshold angle.

(7) The apparatus according to (4), wherein the image processor superimposes the image on the video in a plane of the object for the front view relationship and superimposes the image on the video above the object for the oblique view relationship.

(8) The apparatus according to (1) to (7), wherein the image processor superimposes a text message on the video with the image.

(9) The apparatus according to (8), wherein the image processor superimposes a text message on the video with the image when the image is modified to fit on a display screen.

(10) The apparatus according to (9), wherein the image processor superimposes a text message providing instructions to eliminate modification of the image to fit on the display screen.

(11) The apparatus according to (1), wherein the image processor determines a distance between the object and the apparatus and changes the positional relationship between the image superimposed on the video and the object based on the distance.

(12) The apparatus according to (11), wherein the image processor changes the image superimposed on the video based on the distance.

(13) The apparatus according to (12), wherein the image processor changes the image superimposed on the video based on the distance such that additional detail is displayed when the distance is less than a first threshold distance.

(14) The apparatus according to (13), wherein the image processor changes the image superimposed on the video based on the distance such that additional detail is removed when the distance exceeds a second threshold distance.

(15) The apparatus according to (14), wherein the second threshold distance is shorter than the first threshold distance.

(16) The apparatus according to (1) to (15), further comprising:
a receiver configured to receive the image from an external device.

(17) The apparatus according to (1) to (16), further comprising:
a display configured to display the image superimposed on the video.

(18) The apparatus according to (1) to (17), further comprising:
a sensor configured measure positional information of the apparatus.

(19) A method including:
receiving a video including an object,
determining a positional relationship between the apparatus and the object,
changing a positional relationship between an image superimposed on the video and the object when the positional relationship between the apparatus and the object changes.

(20) A non-transitory computer readable medium encoded with a program that, when loaded on a processor, causes the processor to perform a method including:
receiving a video including an object,
determining a positional relationship between the apparatus and the object,
changing a positional relationship between an image superimposed on the video and the object when the positional relationship between the apparatus and the object changes.

REFERENCE SIGNS LIST 100, 200, 300 Information processing apparatus
102 Image pickup unit
104 Image recognition unit
108 Positional relationship detection unit
110 Selection unit
114 Display target information output unit
116 Message information output unit
118 Display control unit
120 Display unit
222 Sensor unit
324 Communication unit
obj_r Real object
obj_v Virtual object

The invention claimed is:

1. A device comprising:
a sensor configured to measure motion of the device;
a display configured to display a virtual object; and
circuitry configured to
acquire an image data of a real space including an object;
detect an angle between a direction of the object and a direction of the device based on the acquired image data;
determine a display mode of the virtual object based on the angle between the direction of the object and the direction of the device; and
control the display to display the virtual object based on the determined display mode;
wherein
the display mode is selected from a plurality of display modes including a first display mode and a second display mode;
in the first display mode, the virtual object is displayed with an appearance of being in a plane of the object;
in the second display mode, the virtual object is displayed with an appearance of protruding from the object; and
the first display mode and the second display mode are displayed at different times,
wherein the acquired image data includes data defining a shape of an object.

2. The device of claim 1, wherein
the plurality of display modes further includes a third display mode and a fourth display mode;
in the third display mode, a first amount of information of the object is displayed; and
in the fourth display mode a second amount of information on the object is displayed, the second amount of information being greater than the first amount of information.

3. The device of claim 1, wherein the sensor includes at least one of a gyro sensor, a geomagnetic sensor, and an acceleration sensor.

4. The device of claim 1, wherein the positional relationship between the device and the object is determined further based on motion information of the device measured by the sensor.

5. The device of claim 1, wherein the display mode is determined by comparing the angle to a threshold angle.

6. A method of using a device having a sensor, a display, and circuitry, the method comprising:
measuring motion of the device, using the sensor;
displaying a virtual object on the display;
acquiring, using the circuitry, an image data of a real space including an object;
detecting, using the circuitry, an angle between a direction of the object and a direction of the device based on the acquired image data;

determining, using the circuitry, a display mode of the virtual object based on the angle between the direction of the object and the direction of the device; and controlling, the display, using the circuitry, to display the virtual object based on the determined display mode;

wherein the display mode is selected from a plurality of display modes including a first display mode and a second display mode;

in the first display mode, the virtual object is displayed with an appearance of being in a plane of the object;

in the second display mode, the virtual object is displayed with an appearance of protruding from the object; and the first display mode and the second display mode are displayed at different times, wherein the acquired image data includes data defining a shape of an object.

7. A non-transitory, computer-readable medium storing instructions that, when executed on a device having a sensor, a display, and circuitry, control the device to carry out a method comprising:

measuring motion of the device;

displaying a virtual object;

acquiring an image data of a real space including an object;

detecting an angle between a direction of the object and a direction of the device based on the acquired image data;

determining a display mode of the virtual object based on the angle between the direction of the object and the direction of the device; and displaying the virtual object based on the determined display mode;

wherein the display mode is selected from a plurality of display modes including a first display mode and a second display mode;

in the first display mode, the virtual object is displayed with an appearance of being in a plane of the object;

in the second display mode, the virtual object is displayed with an appearance of protruding from the object; and the first display mode and the second display mode are displayed at different times, wherein the acquired image data includes data defining a shape of an object.

* * * * *